US011068356B2

(12) United States Patent
Agrawal et al.

(10) Patent No.: US 11,068,356 B2
(45) Date of Patent: Jul. 20, 2021

(54) INCREMENTAL EXPORT AND CONVERSION OF VIRTUAL MACHINE SNAPSHOTS

(71) Applicant: RUBRIK, INC., Palo Alto, CA (US)

(72) Inventors: Rohit Agrawal, Mountain View, CA (US); Shaswat Chaubey, Bengaluru (IN); Disheng Su, Palo Alto, CA (US); Koki Yoshida, Palo Alto, CA (US); Mudit Malpani, Mountain View, CA (US)

(73) Assignee: RUBRIK, INC., Palo Alto, CA (US)

( * ) Notice: Subject to any disclaimer, the term of this patent is extended or adjusted under 35 U.S.C. 154(b) by 261 days.

(21) Appl. No.: 16/397,294

(22) Filed: Apr. 29, 2019

(65) Prior Publication Data
US 2020/0341864 A1 Oct. 29, 2020

(51) Int. Cl.
*G06F 11/00* (2006.01)
*G06F 11/14* (2006.01)
*G06F 9/455* (2018.01)

(52) U.S. Cl.
CPC ...... *G06F 11/1469* (2013.01); *G06F 9/45558* (2013.01); *G06F 11/1451* (2013.01); *G06F 2009/45562* (2013.01); *G06F 2009/45575* (2013.01); *G06F 2201/815* (2013.01); *G06F 2201/84* (2013.01)

(58) Field of Classification Search
CPC ....... G06F 9/45558; G06F 2009/45562; G06F 2009/45575; G06F 11/1451; G06F 11/1446; G06F 11/1469; G06F 11/1458; G06F 11/1658; G06F 11/2023; G06F 11/202; G06F 11/203
See application file for complete search history.

(56) References Cited

U.S. PATENT DOCUMENTS

| | | | | |
|---|---|---|---|---|
| 9,727,274 | B2 * | 8/2017 | Baron | G06F 3/0611 |
| 10,474,542 | B2 * | 11/2019 | Mitkar | G06F 11/2097 |
| 10,503,612 | B1 * | 12/2019 | Wang | G06F 11/2041 |
| 2014/0149354 | A1 * | 5/2014 | Chan | G06F 11/2038 707/639 |
| 2015/0261514 | A1 * | 9/2015 | Fu | G06F 9/45558 718/1 |
| 2016/0117163 | A1 * | 4/2016 | Fukui | G06F 9/45558 717/171 |

(Continued)

*Primary Examiner* — Marc Duncan
(74) *Attorney, Agent, or Firm* — Schwegman Lundberg & Woessner, P.A.

(57) ABSTRACT

Methods and systems for reducing the data recovery time when failing back to a primary system from a secondary data backup system using virtual machine conversions and incremental exportation for backed-up virtual machine snapshots are described. Upon detection that the primary system is available to receive replicated snapshots for a virtual machine, the secondary data backup system may identify a first virtual machine snapshot out of a chain of snapshots for the virtual machine (e.g., the earliest in time snapshot within the chain or a middle snapshot in the middle of the chain) and transfer a full image snapshot for the first virtual machine snapshot to the primary system. Thereafter, data changes between the next virtual machine snapshot to be transferred to the primary system and the most-recently hydrated virtual machine on the primary system may be identified and then transferred to the primary system.

20 Claims, 17 Drawing Sheets

(56) References Cited

U.S. PATENT DOCUMENTS

2016/0239396 A1* 8/2016 Deng ................. G06F 11/1666
2019/0114230 A1* 4/2019 Ramachandran ....... G06F 3/067
2020/0333972 A1* 10/2020 Natanzon ............ G06F 11/1469
2020/0409803 A1* 12/2020 Naidu ................ G06F 11/1451

* cited by examiner

```
Virtual Machine A, Version V7 {
    pBase,        ⟶  /snapshots/VM_A/s5/s5.full
    pF1,          ⟶  /snapshots/VM_A/s6/s6.delta
    pF2           ⟶  /snapshots/VM_A/s7/s7.delta
}
```

```
Virtual Machine A, Version V2 {
    pBase,        ⟶  /snapshots/VM_A/s5/s5.full
    pR1,          ⟶  /snapshots/VM_A/s4/s4.delta
    pR2,          ⟶  /snapshots/VM_A/s3/s3.delta
    pR3           ⟶  /snapshots/VM_A/s2/s2.delta
}
```

Versions of Virtual Machine A    Stored Files

Version V1 / Time T1    R4    ▯  ⎫
Version V2 / Time T2    R3    ▭  ⎪
Version V3 / Time T3    R2    ▯  ⎬ Reverse incrementals
Version V4 / Time T4    R1    ▯  ⎪
Version V5 / Time T5    R12   ▯  ⎪
Version V6 / Time T6    R11   ▯  ⎭
Version V7 / Time T7    Base2 ▭▭▭ } Full image

FIG. 2D

Virtual Machine A, Version V7 {
    pBase2,        ⟶   /snapshots/VM_A/s7/s7.full
}

FIG. 2E

Virtual Machine A, Version V2 {
    pBase2,        ⟶   /snapshots/VM_A/s7/s7.full
    pR11,          ⟶   /snapshots/VM_A/s6/s6.delta
    pR12,          ⟶   /snapshots/VM_A/s5/s5.delta
    pR1,           ⟶   /snapshots/VM_A/s4/s4.delta
    pR2,           ⟶   /snapshots/VM_A/s3/s3.delta
    pR3            ⟶   /snapshots/VM_A/s2/s2.delta
}

FIG. 2F

Virtual Machine A, Version VS {
    pBaseA,
    pR4,
}

Virtual Machine A, Version VU {
    pBaseB,
    pR1,
    pR2,
    pR3
}

```
Virtual Machine A, Version VU {
    pBaseA,
    pF9
}
```

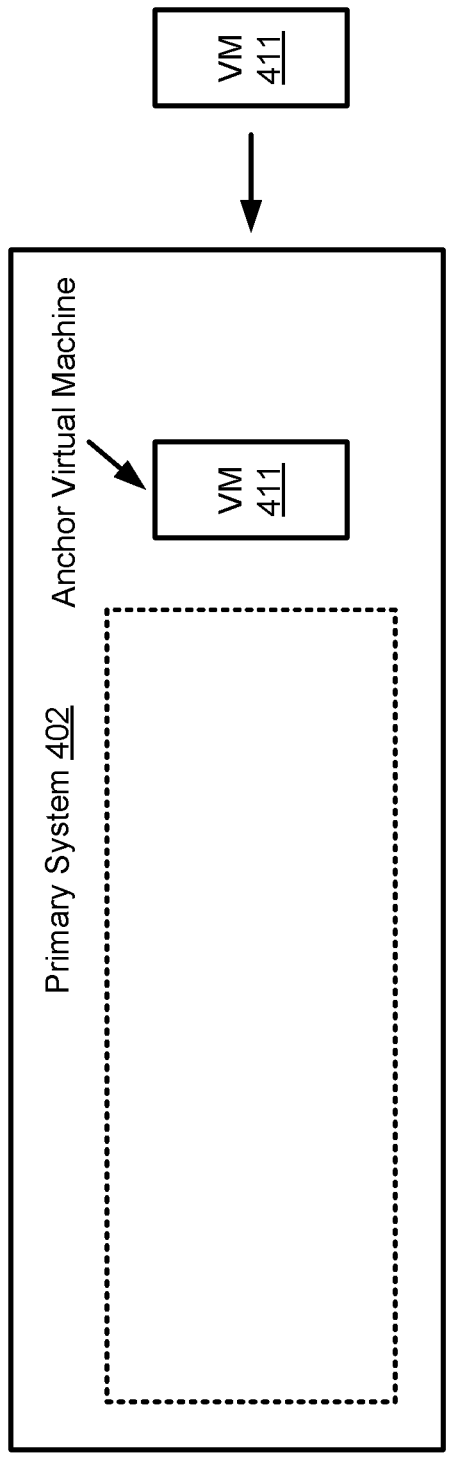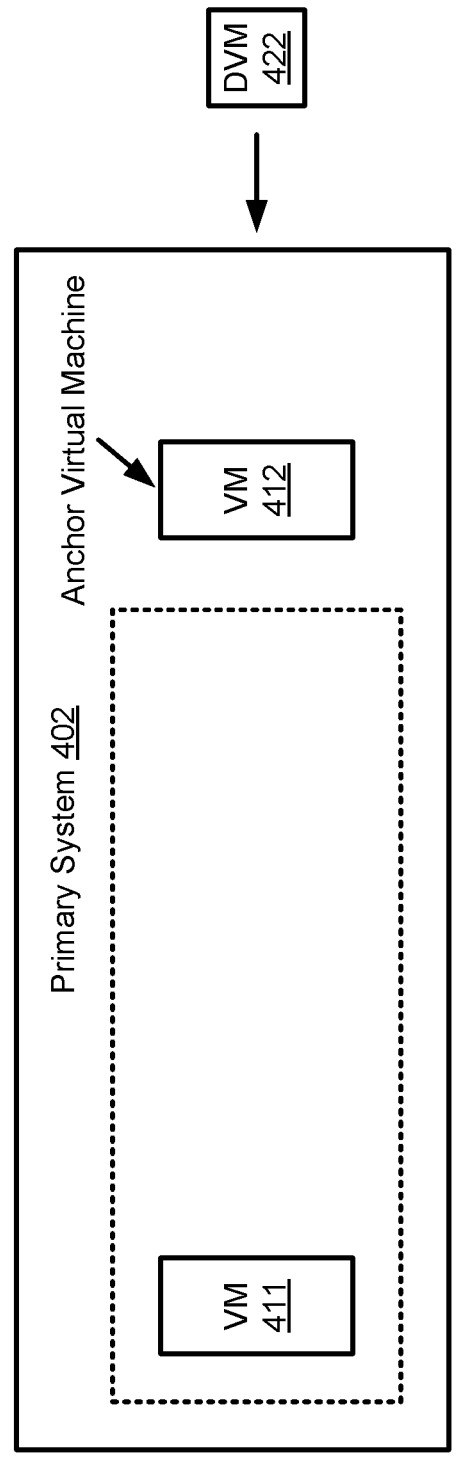
FIG. 4A
FIG. 4B

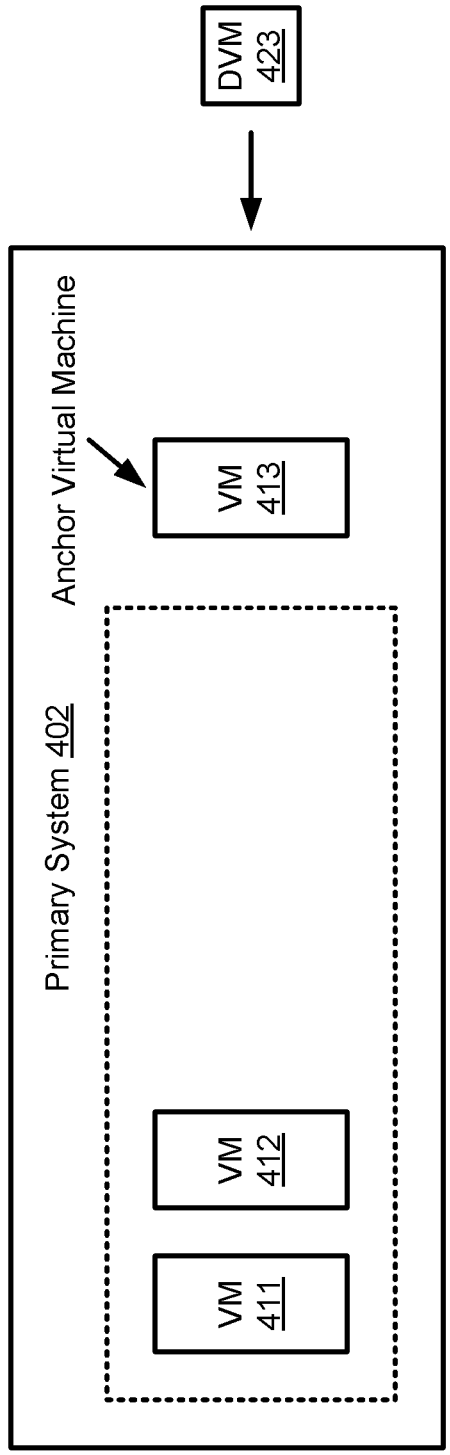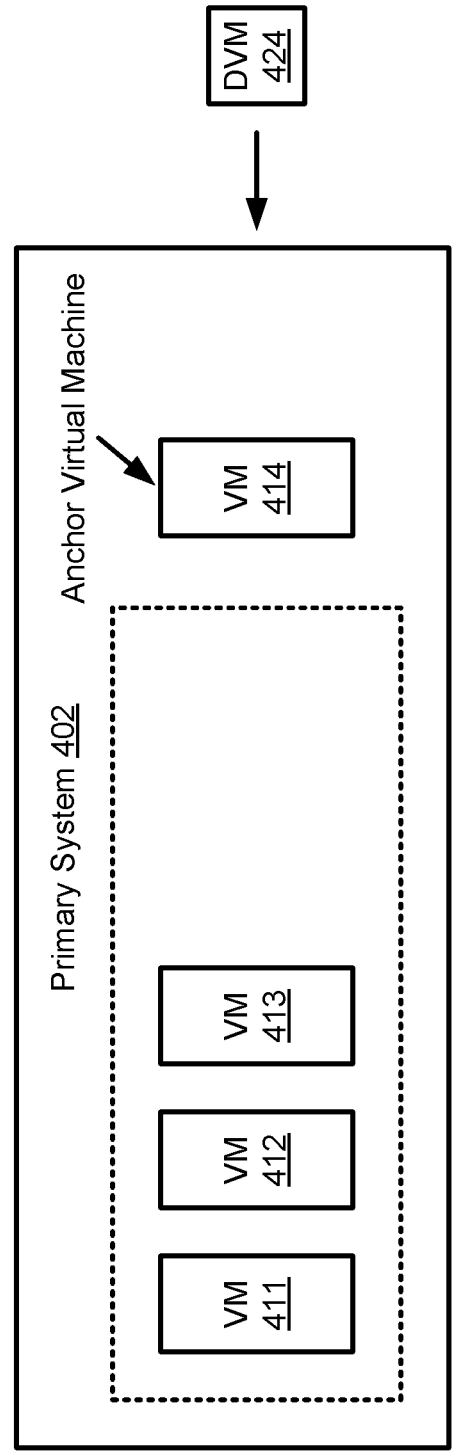
FIG. 4C
FIG. 4D

INCREMENTAL EXPORT AND CONVERSION OF VIRTUAL MACHINE SNAPSHOTS

BACKGROUND

Virtualization allows virtual hardware to be created and decoupled from the underlying physical hardware. For example, a hypervisor running on a host machine or server may be used to create one or more virtual machines that may each run the same operating system or different operating systems (e.g., a first virtual machine may run a Windows® operating system and a second virtual machine may run a Unix-like operating system such as OS X®). A virtual machine may comprise a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications executed by the virtual machine may be stored using the virtual disk. The virtual machine may be stored (e.g., using a datastore comprising one or more physical storage devices) as a set of files including a virtual disk file for storing the contents of the virtual disk and a virtual machine configuration file for storing configuration settings for the virtual machine. The configuration settings may include the number of virtual processors (e.g., four virtual CPUs), the size of a virtual memory, and the size of a virtual disk (e.g., a 2 TB virtual disk) for the virtual machine.

BRIEF DESCRIPTION OF THE DRAWINGS

FIGS. 2A-2K depict various embodiments of sets of files and data structures associated with managing and storing snapshots of virtual machines.

FIGS. 4A-4J depict various embodiments of a primary system during a failback operation.

DETAILED DESCRIPTION

Figure 1A:
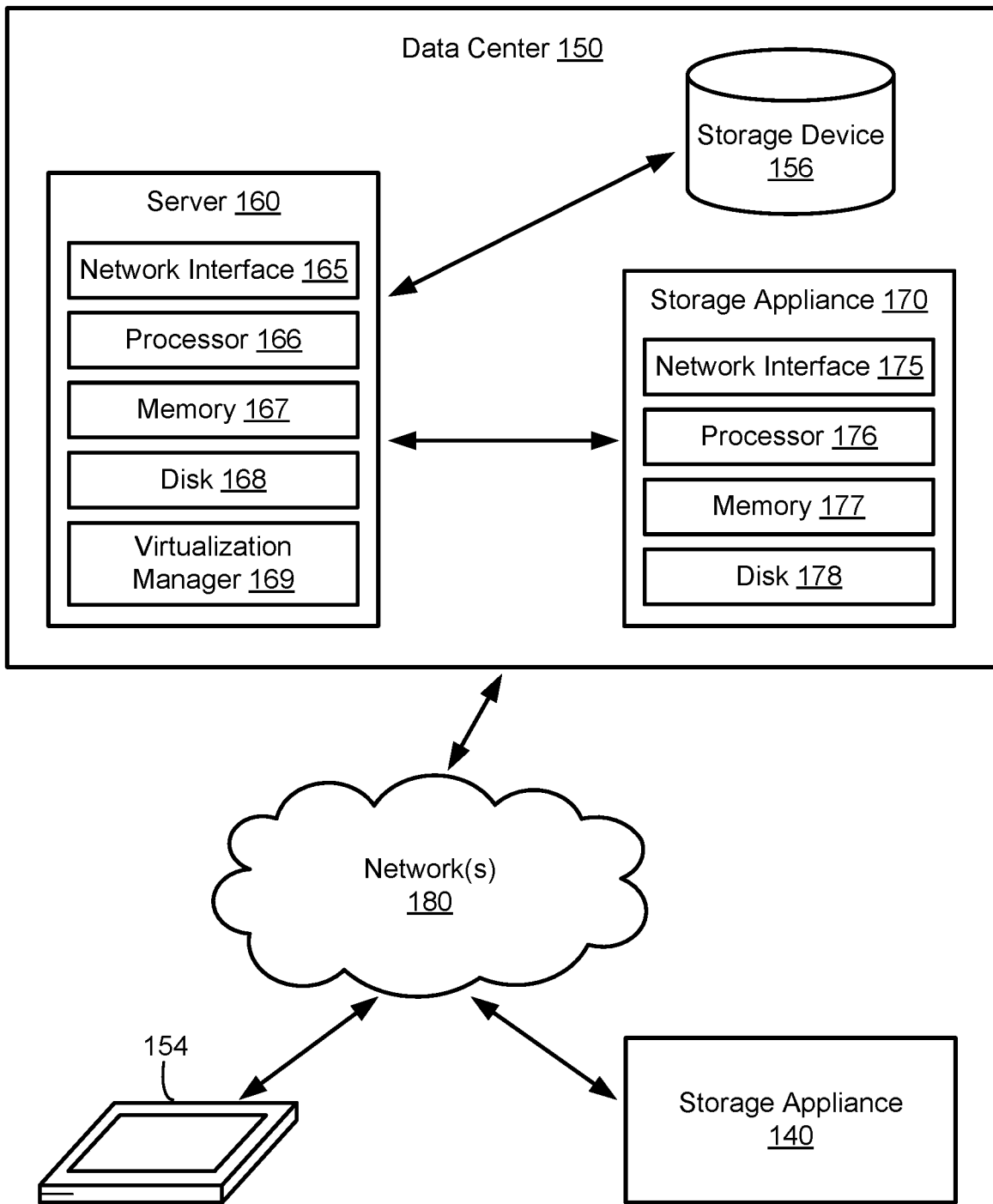
FIG. 1A depicts one embodiment of a networked computing environment.

Technology is described for reducing the data recovery time when failing back to a primary system from a secondary data backup system using virtual machine conversions and incremental exportation for backed-up virtual machine snapshots. Due to a system failure, the primary system may failover to the secondary data backup system. Subsequently, a failback operation may be performed in which data is synchronized back to the primary system. The primary system may comprise a first virtualized environment (e.g., with VMware virtual machines) and the secondary data backup system may comprise a second virtualized environment (e.g., with Amazon EC2 instances). In one example, the primary system may comprise a primary on-prem virtualized environment and the secondary data backup system may comprise a secondary cloud virtualized environment in which virtual machines are migrated from the secondary cloud virtualized environment (e.g., an Amazon Web Services environment) to the primary on-prem virtualized environment (e.g., a VMware vCenter environment) during the failback operation.

Upon detection that the primary system is available to receive replicated snapshots for a virtual machine, the secondary data backup system may identify a first virtual machine snapshot out of a chain of snapshots for the virtual machine (e.g., the earliest in time snapshot within the chain or a middle snapshot in the middle of the chain) and transfer a full image snapshot for the first virtual machine snapshot to the primary system. Thereafter, data changes between the next virtual machine snapshot to be transferred to the primary system (e.g., comprising the fifth snapshot of the virtual machine) and the most-recently hydrated virtual machine on the primary system (e.g., comprising the fourth snapshot of the virtual machine) may be identified (e.g., via comparison of fingerprint files between the two snapshots) and then transferred to the primary system. Fingerprint values for data blocks of the two snapshots may be compared in order to determine whether the data blocks contain identical data. In one example, the fingerprint values for the data blocks may be generated using a fingerprinting algorithm, such as the Rabin fingerprint algorithm or a cryptographic hashing algorithm (e.g., MD5 or one of the SHA-family of algorithms), and then compared as a fingerprint (or fingerprint value) may be used to uniquely or substantially identify the data within a data block. The most-recently hydrated virtual machine may comprise a virtual machine running on the primary system that is acting as a temporary anchor virtual machine for receiving the data changes from the secondary data backup system. After the data changes have been received and applied to the most-recently hydrated virtual machine, the most-recently hydrated virtual machine may be updated to the next virtual machine snapshot (e.g., updated from comprising the fourth snapshot of the virtual machine to the fifth snapshot of the virtual machine). Thus, the received data changes may be applied to update a temporary virtual machine running within the primary system that may comprise the most-recently hydrated virtual machine.

Over time, as each hydrated virtual machine is generated, the primary system may capture and store a snapshot of the hydrated virtual machine to recreate and store the entire chain of snapshots for the virtual machine. The hydrated virtual machine may be protected from garbage collection and excluded from data protection policies on the primary system. In some cases, a test failback virtual machine may be created as a linked clone (e.g., a clone with disk sharing) of the hydrated virtual machine such that the hydrated virtual machine may be used to hydrate subsequent snapshots while the test failback virtual machine is running. A linked clone may comprise a copy of a virtual machine that shares one or more virtual disks with a parent virtual machine in an ongoing manner. The linked clone may be created from a snapshot of the parent virtual machine and all files available to the parent virtual machine at the time that the linked clone was created may remain available to the linked clone. Over time, data changes to the one or more virtual disks of the parent virtual machine will not affect the linked clone and data changes to the one or more virtual disks for the linked clone will not affect the parent virtual machine. One benefit of utilizing one or more linked clones for the hydrated virtual machines is that disk space may be conserved.

In some embodiments, linked clones may be used to create a top hydrated virtual machine and a bottom hydrated virtual machine in which forward deltas or forward data changes (e.g., from a forward incremental file) are applied to the bottom hydrated virtual machine and reverse deltas or reverse data changes (e.g., from a reverse incremental file) are applied to the top hydrated virtual machine. In this case, if the first full image snapshot received from the primary system comprises the middle snapshot in a chain of snapshots, then the chain may be replicated in a middle-out manner. For example, if the middle snapshot comprises the third snapshot of a virtual machine, then the forward data changes may be applied to the bottom hydrated virtual machine to generate a fourth snapshot of the virtual machine and the reverse data changes may be applied to the top hydrated virtual machine to generate a second snapshot of the virtual machine.

If the virtualized environments for the primary system and the secondary data backup system are different, a virtual machine conversion flow may be executed (e.g., to convert EC2 instances to VMware virtual machines). A virtual machine may include an operating system (OS) disk and a data disk. To allow the virtual machine to run within a different virtualization environment, the OS disk for the virtual machine may be reconfigured to change the operating system used by the virtual machine, to install/uninstall drivers, and to enable/disable services. The data disk is not modified during the conversion. The OS disk of the virtual machine may be attached to a converter instance to update files associated with drivers, kernel modules, and network configurations.

In some embodiments, during a failback operation in which backed up virtual machines are transferred from a second virtualized environment (e.g., the secondary data backup system) to a first virtualized environment (e.g., the primary system) different from the first virtualized environment, point in time versions of the backed-up virtual machines stored on the second virtualized environment may be converted and then incrementally exported to the primary system. One or more temporary anchor virtual machines may be instantiated on-demand on the primary system in order to apply incremental data changes corresponding with different point in time versions of the backed-up virtual machines and to capture and store snapshots of the different point in time versions of the backed-up virtual machines. The one or more temporary anchor virtual machines running on the primary system may be instantiated to capture the required snapshots and then terminated in order to conserve compute and memory resources for the primary system. One technical benefit of instantiating and terminating the one or more temporary anchor virtual machines on-demand is that the storage and compute costs associated with migrating the backed-up virtual machines from the secondary data backup system to the primary system may be reduced.

An integrated data management and storage system may be configured to manage the automated storage, backup, deduplication, replication, recovery, and archival of data within and across physical and virtual computing environments. The integrated data management and storage system may provide a unified primary and secondary storage system with built-in data management that may be used as both a backup storage system and a "live" primary storage system for primary workloads. In some cases, the integrated data management and storage system may manage the extraction and storage of historical snapshots associated with different point in time versions of virtual machines and/or real machines (e.g., a hardware server, a laptop, a tablet computer, a smartphone, or a mobile computing device) and provide near instantaneous recovery of a backed-up version of a virtual machine, a real machine, or one or more files residing on the virtual machine or the real machine. The integrated data management and storage system may allow backed-up versions of real or virtual machines to be directly mounted or made accessible to primary workloads in order to enable the near instantaneous recovery of the backed-up versions and allow secondary workloads (e.g., workloads for experimental or analytics purposes) to directly use the integrated data management and storage system as a primary storage target to read or modify past versions of data.

The integrated data management and storage system may include a distributed cluster of storage nodes that presents itself as a unified storage system even though numerous storage nodes may be connected together and the number of connected storage nodes may change over time as storage nodes are added to or removed from the cluster. The integrated data management and storage system may utilize a scale-out node based architecture in which a plurality of data storage appliances comprising one or more nodes are in communication with each other via one or more networks. Each storage node may include two or more different types of storage devices and control circuitry configured to store, deduplicate, compress, and/or encrypt data stored using the two or more different types of storage devices. In one example, a storage node may include two solid-state drives (SSDs), three hard disk drives (HDDs), and one or more processors configured to concurrently read data from and/or write data to the storage devices. The integrated data management and storage system may replicate and distribute versioned data, metadata, and task execution across the distributed cluster to increase tolerance to node and disk failures (e.g., snapshots of a virtual machine may be triply mirrored across the cluster). Data management tasks may be assigned and executed across the distributed cluster in a fault tolerant manner based on the location of data within the cluster (e.g., assigning tasks to nodes that store data related to the task) and node resource availability (e.g., assigning tasks to nodes with sufficient compute or memory capacity for the task).

The integrated data management and storage system may apply a data backup and archiving schedule to backed-up real and virtual machines to enforce various backup service level agreements (SLAs), recovery point objectives (RPOs), recovery time objectives (RTOs), data retention requirements, and other data backup, replication, and archival policies across the entire data lifecycle. For example, the data backup and archiving schedule may require that snapshots of a virtual machine are captured and stored every four hours for the past week, every day for the past six months, and every week for the past five years.

As virtualization technologies are adopted into information technology (IT) infrastructures, there is a growing need for recovery mechanisms to support mission critical application deployment within a virtualized infrastructure. However, a virtualized infrastructure may present a new set of challenges to the traditional methods of data management due to the higher workload consolidation and the need for instant, granular recovery. The benefits of using an integrated data management and storage system include the ability to reduce the amount of data storage required to backup real and virtual machines, the ability to reduce the amount of data storage required to support secondary or non-production workloads, the ability to provide a non-passive storage target in which backup data may be directly accessed and modified, and the ability to quickly restore earlier versions of virtual machines and files stored locally or in the cloud.

FIG. 1A depicts one embodiment of a networked computing environment 100 in which the disclosed technology may be practiced. As depicted, the networked computing environment 100 includes a data center 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system. The one or more networks 180 may include a cellular network, a mobile network, a wireless network, a wired network, a secure network such as an enterprise private network, an unsecure network such as a wireless open network, a local area network (LAN), a wide area network (WAN), and the Internet.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The server 160 may comprise a production hardware server. The storage appliance 170 may include a data management system for backing up virtual machines, real machines, virtual disks, real disks, and/or electronic files within the data center 150. The server 160 may be used to create and manage one or more virtual machines associated with a virtualized infrastructure. The one or more virtual machines may run various applications, such as a database application or a web server. The storage device 156 may include one or more hardware storage devices for storing data, such as a hard disk drive (HDD), a magnetic tape drive, a solid-state drive (SSD), a storage area network (SAN) storage device, or a networked-attached storage (NAS) device. In some cases, a data center, such as data center 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

A server, such as server 160, may allow a client to download information or files (e.g., executable, text, application, audio, image, or video files) from the server or to perform a search query related to particular information stored on the server. In some cases, a server may act as an application server or a file server. In general, a server may refer to a hardware device that acts as the host in a client-server relationship or a software process that shares a resource with or performs work for one or more clients. One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. For example, the virtualization manager 169 may manage the provisioning of virtual machines running within the virtualized infrastructure and provide an interface to computing devices interacting with the virtualized infrastructure. The virtualization manager 169 may also perform various virtual machine related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer readable instructions stored in memory 177 in order to perform processes described herein. Processor 176 may include one or more processing units, such as one or more CPUs and/or one or more GPUs. Memory 177 may comprise one or more types of memory (e.g., RAM, SRAM, DRAM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point in time versions of one or more virtual machines.

In another embodiment, the storage appliance 170 may comprise a virtual appliance that comprises four virtual machines. Each of the virtual machines in the virtual appliance may have 64 GB of virtual memory, a 12 TB virtual disk, and a virtual network interface controller. In this case, the four virtual machines may be in communication with the one or more networks 180 via the four virtual network interface controllers. The four virtual machines may comprise four nodes of a virtual cluster.

The networked computing environment 100 may provide a cloud computing environment for one or more computing devices. In one embodiment, the networked computing environment 100 may include a virtualized infrastructure that provides software, data processing, and/or data storage services to end users accessing the services via the networked computing environment. In one example, networked computing environment 100 may provide cloud-based work productivity or business related applications to a computing device, such as computing device 154. The computing device 154 may comprise a mobile computing device or a tablet computer. The storage appliance 140 may comprise a cloud-based data management system for backing up virtual machines and/or files within a virtualized infrastructure, such as virtual machines running on server 160 or files stored on server 160.

In some embodiments, the storage appliance 170 may manage the extraction and storage of virtual machine snapshots associated with different point in time versions of one or more virtual machines running within the data center 150. A snapshot of a virtual machine may correspond with a state of the virtual machine at a particular point in time. In some cases, the snapshot may capture the state of various virtual machine settings and the state of one or more virtual disks for the virtual machine. In response to a restore command from the server 160, the storage appliance 170 may restore a point in time version of a virtual machine or restore point in time versions of one or more files located on the virtual machine and transmit the restored data to the server 160. In response to a mount command from the server 160, the storage appliance 170 may allow a point in time version of a virtual machine to be mounted and allow the server 160 to read and/or modify data associated with the point in time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations), incremental files associated with commonly restored virtual machine versions, and current day incremental files or incremental files corresponding with snapshots captured within the past 24 hours.

An incremental file may comprise a forward incremental file or a reverse incremental file. A forward incremental file may include a set of data representing changes that have occurred since an earlier point in time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding with a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface) that displays virtual machine information, such as identifications of the virtual machines protected and the historical versions or time machine views for each of the virtual machines protected, and allows an end user to search, select, and control virtual machines managed by the storage appliance. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

Figure 1B:
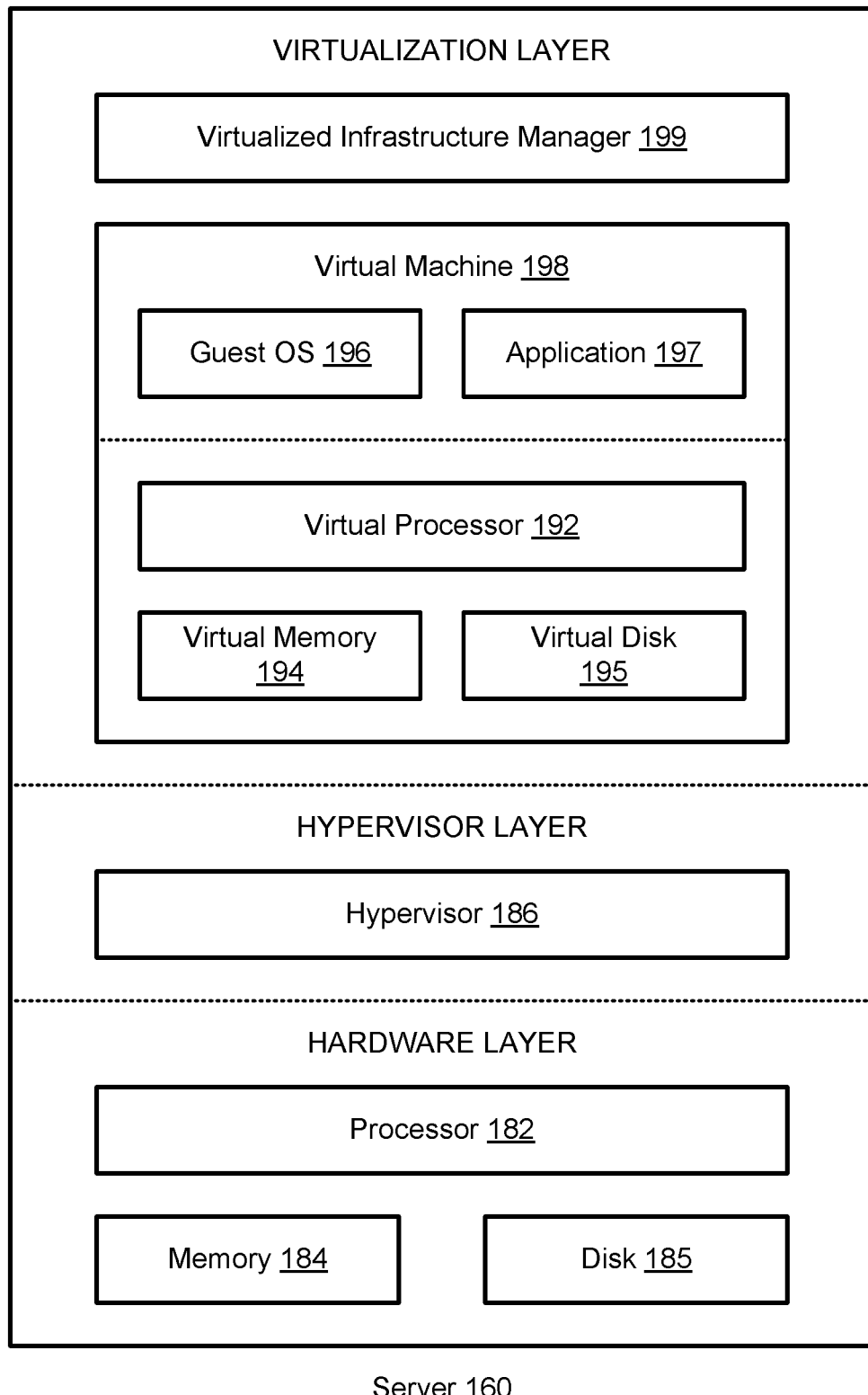
FIG. 1B depicts one embodiment of a server.

FIG. 1B depicts one embodiment of server 160 in FIG. 1A. The server 160 may comprise one server out of a plurality of servers that are networked together within a data center. In one example, the plurality of servers may be positioned within one or more server racks within the data center. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197. The virtualized infrastructure manager 199, which may correspond with the virtualization manager 169 in FIG. 1A, may run on a virtual machine or natively on the server 160. The virtualized infrastructure manager 199 may provide a centralized platform for managing a virtualized infrastructure that includes a plurality of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1A or storage appliance 170 in FIG. 1A, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time (e.g., 6:30 p.m. on Jun. 29, 2017) and a second snapshot of the virtual machine may correspond with a second state of the virtual machine at a second point in time subsequent to the first point in time (e.g., 6:30 p.m. on Jun. 30, 2017).

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with changed blocks stored on a virtual disk of the virtual machine that have changed since the last snapshot of the virtual machine was taken. In one embodiment, the data management application may specify a first point in time and a second point in time and the virtualized infrastructure manager 199 may output one or more changed data blocks associated with the virtual machine that have been modified between the first point in time and the second point in time.

Figure 1C:
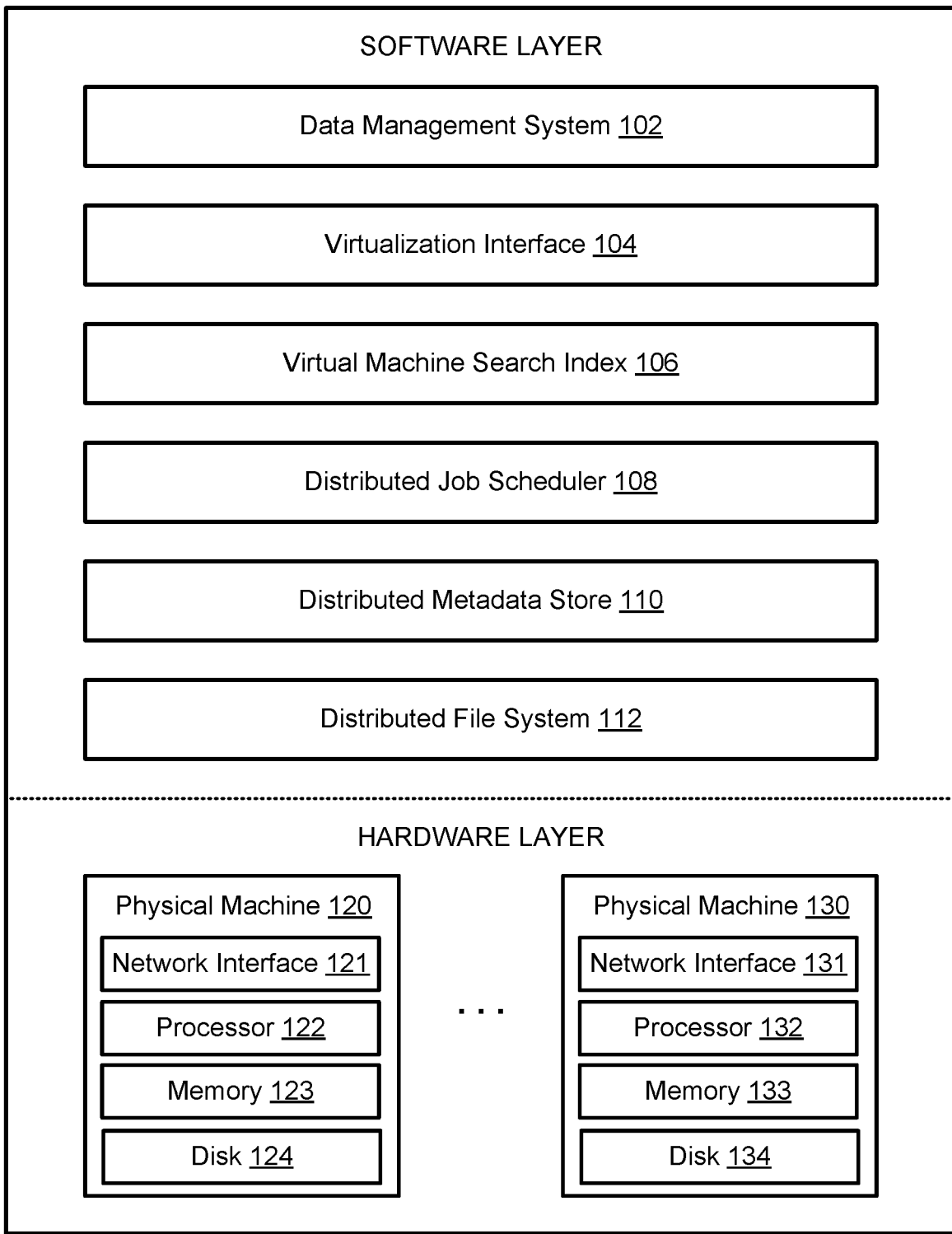
FIG. 1C depicts one embodiment of a storage appliance.

FIG. 1C depicts one embodiment of a storage appliance, such as storage appliance 170 in FIG. 1A. The storage appliance may include a plurality of physical machines that may be grouped together and presented as a single computing system. Each physical machine of the plurality of physical machines may comprise a node in a cluster (e.g., a failover cluster). As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer readable instructions stored in memory 133 to perform processes described herein. Disk 134 may include a hard disk drive and/or a solid-state drive. In some cases, disk 134 may include a flash-based SSD or a hybrid HDD/SSD drive. In one embodiment, the storage appliance 170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

As depicted in FIG. 1C, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snapshots/). A directory for each virtual machine protected using the storage appliance 170 may be created (e.g., the directory for Virtual Machine A may be/snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in/snapshots/VM_A/s1/ and a second snapshot of Virtual Machine A may reside in/snapshots/VM_A/s2/).

The distributed file system 112 may present itself as a single file system, in which as new physical machines or nodes are added to the storage appliance 170, the cluster may automatically discover the additional nodes and automatically increase the available capacity of the file system for storing files and other data. Each file stored in the distributed file system 112 may be partitioned into one or more chunks. Each of the one or more chunks may be stored within the distributed file system 112 as a separate file. The files stored within the distributed file system 112 may be replicated or mirrored over a plurality of physical machines, thereby creating a load-balanced and fault tolerant distributed file system. In one example, storage appliance 170 may include ten physical machines arranged as a failover cluster and a first file corresponding with a full-image snapshot of a virtual machine (e.g., /snapshots/VM_A/s1/s1.full) may be replicated and stored on three of the ten machines. In some cases, the data chunks associated with a file stored in the distributed file system 112 may include replicated data (e.g., due to n-way mirroring) or parity data (e.g., due to erasure coding). When a disk storing one of the data chunks fails, then the distributed file system may regenerate the lost data and store the lost data using a new disk.

In one embodiment, the distributed file system 112 may be used to store a set of versioned files corresponding with a virtual machine. The set of versioned files may include a first file comprising a full image of the virtual machine at a first point in time and a second file comprising an incremental file relative to the full image. The set of versioned files may correspond with a snapshot chain for the virtual machine. The distributed file system 112 may determine a first set of data chunks that includes redundant information for the first file (e.g., via application of erasure code techniques) and store the first set of data chunks across a plurality of nodes within a cluster. The placement of the first set of data chunks within the cluster may be determined based on the locations of other data related to the first set of data chunks (e.g., the locations of other chunks corresponding with the second file or other files within the snapshot chain for the virtual machine). In some embodiments, the distributed file system 112 may also co-locate data chunks or replicas of virtual machines discovered to be similar to each other in order to allow for cross virtual machine deduplication. In this case, the placement of the first set of data chunks may be determined based on the locations of other data corresponding with a different virtual machine that has been determined to be sufficiently similar to the virtual machine.

The distributed metadata store 110 may comprise a distributed database management system that provides high availability without a single point of failure. The distributed metadata store 110 may act as a quick-access database for various components in the software stack of the storage appliance 170 and may store metadata corresponding with stored snapshots using a solid-state storage device, such as a solid-state drive (SSD) or a Flash-based storage device. In one embodiment, the distributed metadata store 110 may comprise a database, such as a distributed document oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine.

The concepts described herein may also be applicable to managing versions of a real machine or versions of electronic files. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snapshot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals. In some cases, a first version of a virtual machine corresponding with a first snapshot of the virtual machine at a first point in time may be generated by concurrently reading a full image for the virtual machine corresponding with a state of the virtual machine prior to the first point in time from the first storage device while reading one or more incrementals from the second storage device different from the first storage device (e.g., reading the full image from a HDD at the same time as reading 64 incrementals from an SSD).

The distributed job scheduler 108 may comprise a distributed fault tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster and each node may independently determine which tasks to execute. The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The virtualization interface 104 may provide an interface for communicating with a virtualized infrastructure manager managing a virtualized infrastructure, such as the virtualized infrastructure manager 199 in FIG. 1B, and for requesting data associated with virtual machine snapshots from the virtualized infrastructure. The virtualization interface 104 may communicate with the virtualized infrastructure manager using an API for accessing the virtualized infrastructure manager (e.g., to communicate a request for a snapshot of a virtual machine).

The virtual machine search index 106 may include a list of files that have been stored using a virtual machine and a version history for each of the files in the list. Each version of a file may be mapped to the earliest point in time snapshot of the virtual machine that includes the version of the file or to a snapshot of the virtual machine that includes the version of the file (e.g., the latest point in time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

The data management system 102 may comprise an application running on the storage appliance that manages the capturing, storing, deduplication, compression (e.g., using a lossless data compression algorithm such as LZ4 or LZ77), and encryption (e.g., using a symmetric key algorithm such as Triple DES or AES-256) of data for the storage appliance 170. In one example, the data management system 102 may comprise a highest level layer in an integrated software stack running on the storage appliance. The integrated software stack may include the data management system 102, the virtualization interface 104, the distributed job scheduler 108, the distributed metadata store 110, and the distributed file system 112. In some cases, the integrated software stack may run on other computing devices, such as a server or computing device 154 in FIG. 1A. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point in time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

In some embodiments, a plurality of versions of a virtual machine may be stored as a base file associated with a complete image of the virtual machine at a particular point in time and one or more incremental files associated with forward and/or reverse incremental changes derived from the base file. The data management system 102 may patch together the base file and the one or more incremental files in order to generate a particular version of the plurality of versions by adding and/or subtracting data associated with the one or more incremental files from the base file or intermediary files derived from the base file. In some embodiments, each version of the plurality of versions of a virtual machine may correspond with a merged file. A merged file may include pointers or references to one or more files and/or one or more chunks associated with a particular version of a virtual machine. In one example, a merged file may include a first pointer or symbolic link to a base file and a second pointer or symbolic link to an incremental file associated with the particular version of the virtual machine. In some embodiments, the one or more incremental files may correspond with forward incrementals (e.g., positive deltas), reverse incrementals (e.g., negative deltas), or a combination of both forward incrementals and reverse incrementals.

Figure 1D:
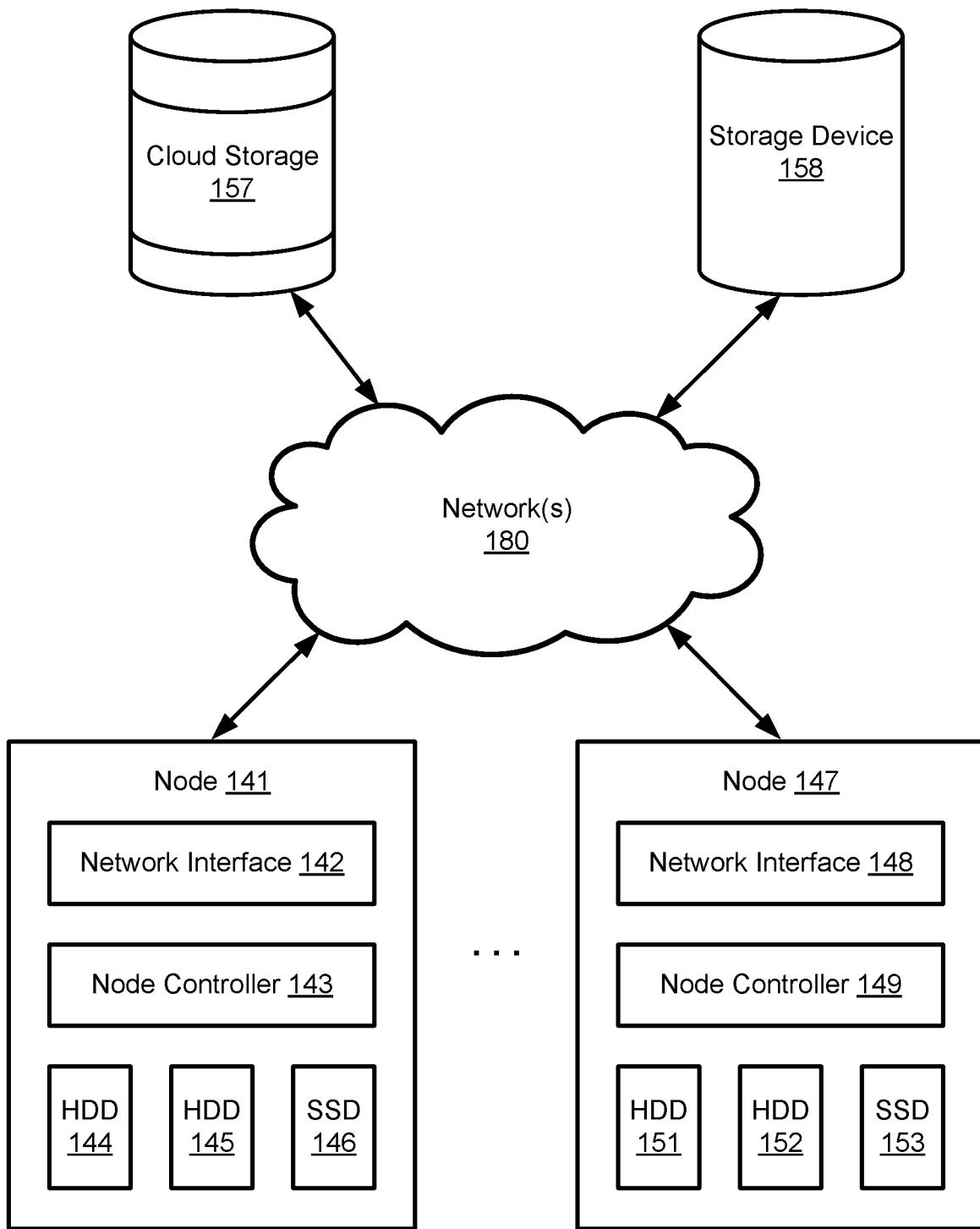
FIG. 1D depicts one embodiment of a portion of an integrated data management and storage system that includes a plurality of nodes in communication with each other and one or more storage devices.

FIG. 1D depicts one embodiment of a portion of an integrated data management and storage system that includes a plurality of nodes in communication with each other and one or more storage devices via one or more networks 180. The plurality of nodes may be networked together and present themselves as a unified storage system. The plurality of nodes includes node 141 and node 147. The one or more storage devices include storage device 157 and storage device 158. Storage device 157 may correspond with a cloud-based storage (e.g., private or public cloud storage). Storage device 158 may comprise a hard disk drive (HDD), a magnetic tape drive, a solid-state drive (SSD), a storage area network (SAN) storage device, or a networked-attached storage (NAS) device. The integrated data management and storage system may comprise a distributed cluster of storage appliances in which each of the storage appliances includes one or more nodes. In one embodiment, node 141 and node 147 may comprise two nodes housed within a first storage appliance, such as storage appliance 170 in FIG. 1C. In another embodiment, node 141 may comprise a first node housed within a first storage appliance and node 147 may comprise a second node housed within a second storage appliance different from the first storage appliance. The first storage appliance and the second storage appliance may be located within a data center, such as data center 150 in FIG. 1A, or located within different data centers.

As depicted, node 141 includes a network interface 142, a node controller 143, and a first plurality of storage devices including HDDs 144-145 and SSD 146. The first plurality of storage devices may comprise two or more different types of storage devices. The node controller 143 may comprise one or more processors configured to store, deduplicate, compress, and/or encrypt data stored within the first plurality of storage devices. Node 147 includes a network interface 148, a node controller 149, and a second plurality of storage devices including HDDs 151-152 and SSD 153. The second plurality of storage devices may comprise two or more different types of storage devices. The node controller 149 may comprise one or more processors configured to store, deduplicate, compress, and/or encrypt data stored within the second plurality of storage devices. In some cases, node 141 may correspond with physical machine 120 in FIG. 1C and node 147 may correspond with physical machine 130 in FIG. 1C.

FIGS. 2A-2K depict various embodiments of sets of files and data structures (e.g., implemented using merged files) associated with managing and storing snapshots of virtual machines. Although various embodiments may be described in reference to the management of virtual machine snapshots, the concepts may be applied to the management of other data snapshots as well, such as snapshots of databases, filesets (e.g., Network Attached Storage filesets), and sets of electronic files.

Figures 2A, 2B, 2C:
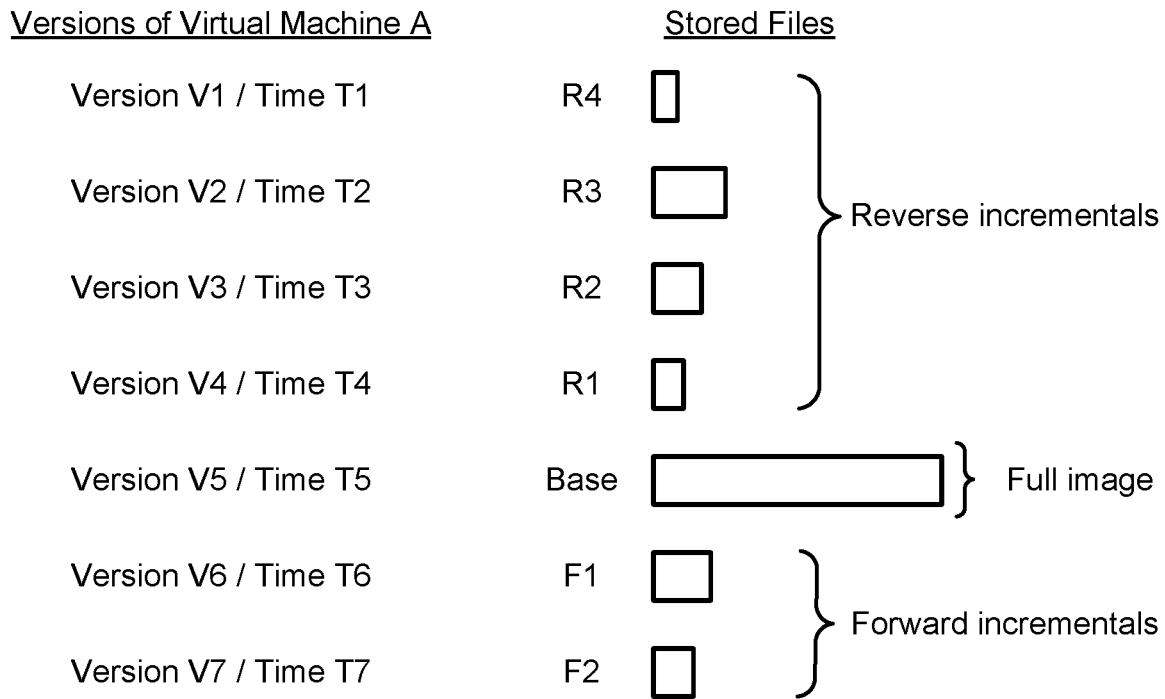

FIG. 2A depicts one embodiment of a set of virtual machine snapshots stored as a first set of files. The first set of files may be stored using a distributed file system, such as distributed file system 112 in FIG. 1C. As depicted, the first set of files includes a set of reverse incrementals (R1-R4), a full image (Base), and a set of forward incrementals (F1-F2). The set of virtual machine snapshots includes different versions of a virtual machine (versions V1-V7 of Virtual Machine A) captured at different points in time (times T1-T7). In some cases, the file size of the reverse incremental R3 and the file size of the forward incremental F2 may both be less than the file size of the base image corresponding with version V5 of Virtual Machine A. The base image corresponding with version V5 of Virtual Machine A may comprise a full image of Virtual Machine A at point in time T5. The base image may include a virtual disk file for Virtual Machine A at point in time T5. The reverse incremental R3 corresponds with version V2 of Virtual Machine A and the forward incremental F2 corresponds with version V7 of Virtual Machine A. The forward incremental F1 may be associated with the data changes that occurred to Virtual Machine A between time T5 and time T6 and may comprise one or more changed data blocks.

In some embodiments, each snapshot of the set of virtual machine snapshots may be stored within a storage appliance, such as storage appliance 170 in FIG. 1A. In other embodiments, a first set of the set of virtual machine snapshots may be stored within a first storage appliance and a second set of the set of virtual machine snapshots may be stored within a second storage appliance, such as storage appliance 140 in FIG. 1A. In this case, a data management system may extend across both the first storage appliance and the second storage appliance. In one example, the first set of the set of virtual machine snapshots may be stored within a local cluster repository (e.g., recent snapshots of the file may be located within a first data center) and the second set of the set of virtual machine snapshots may be stored within a remote cluster repository (e.g., older snapshots or archived snapshots of the file may be located within a second data center) or a cloud repository.

FIG. 2B depicts one embodiment of a merged file for generating version V7 of Virtual Machine A using the first set of files depicted in FIG. 2A. The merged file includes a first pointer (pBase) that references the base image Base (e.g., via the path /snapshots/VM_A/s5/s5.full), a second pointer (pF1) that references the forward incremental F1 (e.g., via the path/snapshots/VM_A/s6/s6.delta), and a third pointer (pF2) that references the forward incremental F2 (e.g., via the path/snapshots/VM_A/s7/s7.delta). In one embodiment, to generate the full image of version V7 of Virtual Machine A, the base image may be acquired, the data changes associated with forward incremental F1 may be applied to (or patched to) the base image to generate an intermediate image, and then the data changes associated with forward incremental F2 may be applied to the intermediate image to generate the full image of version V7 of Virtual Machine A.

FIG. 2C depicts one embodiment of a merged file for generating version V2 of Virtual Machine A using the first set of files depicted in FIG. 2A. The merged file includes a first pointer (pBase) that references the base image Base (e.g., via the path /snapshots/VM_A/s5/s5.full), a second pointer (pR1) that references the reverse incremental R1 (e.g., via the path/snapshots/VM_A/s4/s4.delta), a third pointer (pR2) that references the reverse incremental R2 (e.g., via the path/snapshots/VM_A/s3/s3.delta), and a fourth pointer (pR3) that references the reverse incremental R3 (e.g., via the path/snapshots/VM_A/s2/s2.delta). In one embodiment, to generate the full image of version V2 of Virtual Machine A, the base image may be acquired, the data changes associated with reverse incremental R1 may be applied to the base image to generate a first intermediate image, the data changes associated with reverse incremental R2 may be applied to the first intermediate image to generate a second intermediate image, and then the data changes associated with reverse incremental R3 may be applied to the second intermediate image to generate the full image of version V2 of Virtual Machine A.

FIG. 2D depicts one embodiment of a set of virtual machine snapshots stored as a second set of files after a rebasing process has been performed using the first set of files in FIG. 2A. The second set of files may be stored using a distributed file system, such as distributed file system 112 in FIG. 1C. The rebasing process may generate new files R12, R11, and Base2 associated with versions V5-V7 of Virtual Machine A in order to move a full image closer to a more recent version of Virtual Machine A and to improve the reconstruction time for the more recent versions of Virtual Machine A. The data associated with the full image Base in FIG. 2A may be equivalent to the new file R12 patched over R11 and the full image Base2. Similarly, the data associated with the full image Base2 may be equivalent to the forward incremental F2 in FIG. 2A patched over F1 and the full image Base in FIG. 2A.

The process of moving the full image snapshot for the set of virtual machine snapshots to correspond with the most recent snapshot version may be performed in order to shorten or reduce the chain lengths for the newest or most recent snapshots, which may comprise the snapshots of Virtual Machine A that are the most likely to be accessed. In some cases, a rebasing operation (e.g., that moves the full image snapshot for a set of virtual machine snapshots to correspond with the most recent snapshot version) may be triggered when a number of forward incremental files is greater than a threshold number of forward incremental files for a snapshot chain (e.g., more than 200 forward incremental files). In other cases, a rebasing operation may be triggered when the total disk size for the forward incremental files exceeds a threshold disk size (e.g., is greater than 200 GB) or is greater than a threshold percentage (e.g., is greater than 20%) of the base image for the snapshot chain.

In some cases, the rebasing process may be part of a periodic rebasing process that is applied at a rebasing frequency (e.g., every 24 hours) to each virtual machine of a plurality of protected virtual machines to reduce the number of forward incremental files that need to be patched to a base image in order to restore the most recent version of a virtual machine. Periodically reducing the number of forward incremental files may reduce the time to restore the most recent version of the virtual machine as the number of forward incremental files that need to be applied to a base image to generate the most recent version may be limited. In one example, if a rebasing process is applied to snapshots of a virtual machine every 24 hours and snapshots of the virtual machine are acquired every four hours, then the number of forward incremental files may be limited to at most five forward incremental files.

As depicted, the second set of files includes a set of reverse incrementals (R11-R12 and R1-R4) and a full image (Base2). The set of virtual machine snapshots includes the different versions of the virtual machine (versions V1-V7 of Virtual Machine A) captured at the different points in time (times T1-T7) depicted in FIG. 2A. In some cases, the file size of the reverse incremental R2 may be substantially less than the file size of the base image Base2. The reverse incremental R2 corresponds with version V2 of Virtual Machine A and the base image Base2 corresponds with version V7 of Virtual Machine A. In this case, the most recent version of Virtual Machine A (i.e., the most recent restore point for Virtual Machine A) comprises a full image. To generate earlier versions of Virtual Machine A, reverse incrementals may be applied to (or patched to) the full image Base2. Subsequent versions of Virtual Machine A may be stored as forward incrementals that depend from the full image Base2.

In one embodiment, a rebasing process may be applied to a first set of files associated with a virtual machine in order to generate a second set of files to replace the first set of files. The first set of files may include a first base image from which a first version of the virtual machine may be derived and a first forward incremental file from which a second version of the virtual machine may be derived. The second set of files may include a second reverse incremental file from which the first version of the virtual machine may be derived and a second base image from which the second version of the virtual machine may be derived. During the rebasing process, data integrity checking may be performed to detect and correct data errors in the files stored in a file system, such as distributed file system 112 in FIG. 1C, that are read to generate the second set of files.

FIG. 2E depicts one embodiment of a merged file for generating version V7 of Virtual Machine A using the second set of files depicted in FIG. 2D. The merged file includes a first pointer (pBase2) that references the base image Base2 (e.g., via the path /snapshots/VM_A/s7/s7.full). In this case, the full image of version V7 of Virtual Machine A may be directly acquired without patching forward incrementals or reverse incrementals to the base image Base2 corresponding with version V7 of Virtual Machine A.

FIG. 2F depicts one embodiment of a merged file for generating version V2 of Virtual Machine A using the second set of files depicted in FIG. 2D. The merged file includes a first pointer (pBase2) that references the base image Base2 (e.g., via the path /snapshots/VM_A/s7/s7.full), a second pointer (pR11) that references the reverse incremental R11 (e.g., via the path/snapshots/VM_A/s6/s6.delta), a third pointer (pR12) that references the reverse incremental R12 (e.g., via the path/snapshots/VM_A/s5/s5.delta), a fourth pointer (pR1) that references the reverse incremental R1 (e.g., via the path/snapshots/VM_A/s4/s4.delta), a fifth pointer (pR2) that references the reverse incremental R2 (e.g., via the path /snapshots/VM_A/s3/s3.delta), and a sixth pointer (pR3) that references the reverse incremental R3 (e.g., via the path/snapshots/VM_A/s2/s2.delta). In one embodiment, to generate the full image of version V2 of Virtual Machine A, the base image may be acquired, the data changes associated with reverse incremental R11 may be applied to the base image to generate a first intermediate image, the data changes associated with reverse incremental R12 may be applied to the first intermediate image to generate a second intermediate image, the data changes associated with reverse incremental R1 may be applied to the second intermediate image to generate a third intermediate image, the data changes associated with reverse incremental R2 may be applied to the third intermediate image to generate a fourth intermediate image, and then the data changes associated with reverse incremental R3 may be applied to the fourth intermediate image to generate the full image of version V2 of Virtual Machine A.

Figures 2G, 2H, 2I:
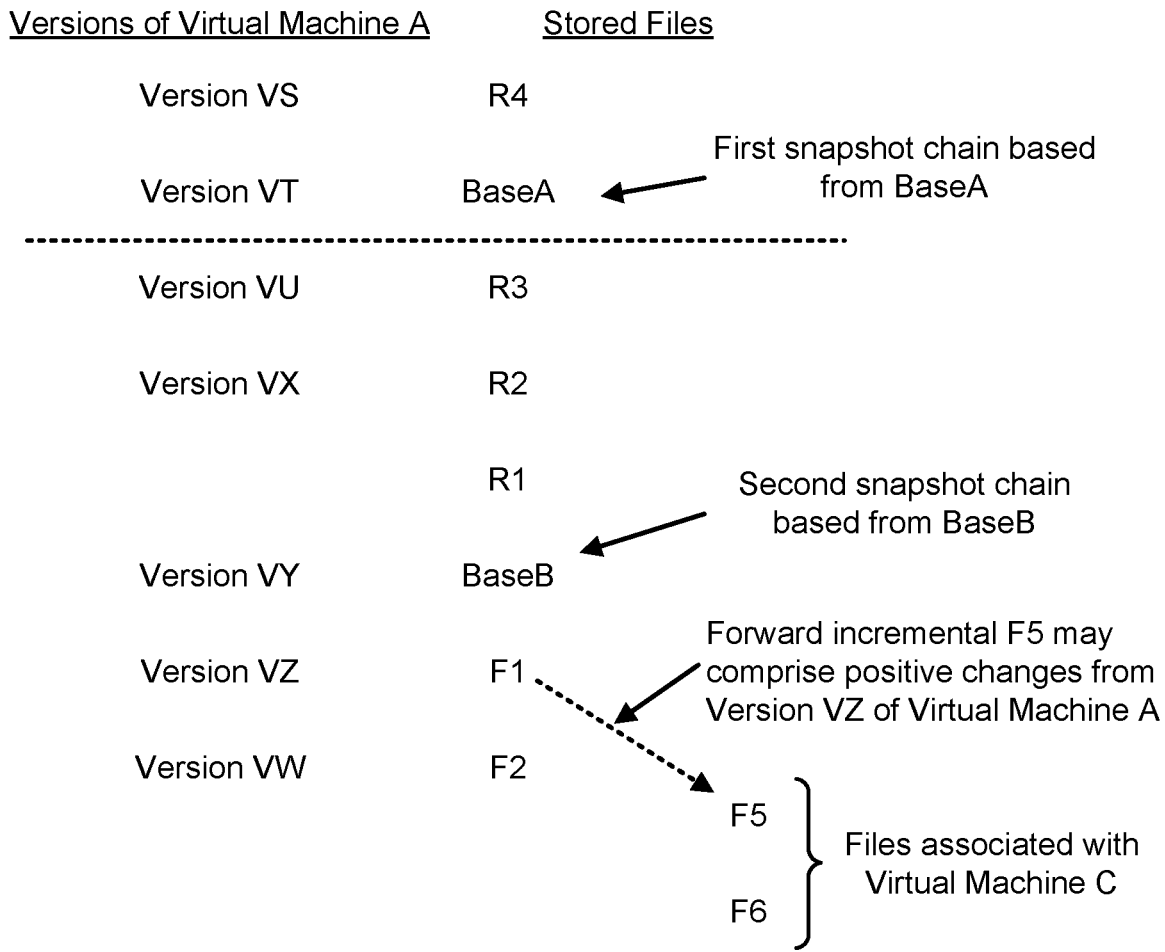

FIG. 2G depicts one embodiment of a set of files associated with multiple virtual machine snapshots. The set of files may be stored using a distributed file system, such as distributed file system 112 in FIG. 1C. As depicted, the set of files includes a second full image (BaseB), a set of forward incrementals (F1-F2 and F5-F6) that derive from the second full image (BaseB), and a set of reverse incrementals (R1-R3) that derive from the second full image (BaseB). The set of files also includes a first full image (BaseA) and a reverse incremental (R4) that derives from the first full image (BaseA). In this case, the depicted snapshots for Virtual Machine A include two different full image snapshots (BaseA and BaseB). Each of the full image snapshots may comprise an anchor snapshot for a snapshot chain. The first full image (BaseA) and the reverse incremental (R4) may comprise a first snapshot chain with the first full image acting as the anchor snapshot. A second snapshot chain may comprise the second full image (BaseB) acting as the anchor snapshot for the second snapshot chain, the set of forward incrementals (F1-F2), and the set of reverse incrementals (R1-R3). The first snapshot chain and the second snapshot chain may be independent of each other and independently managed. For example, the base image associated with the second snapshot chain for Virtual Machine A may be repositioned (e.g., via rebasing) without impacting the first snapshot chain for Virtual Machine A.

A third snapshot chain for Virtual Machine C may comprise the second full image (BaseB) and forward incrementals (F1 and F5-F6). The first snapshot chain for Virtual Machine A and the third snapshot chain for Virtual Machine C may be independent of each other and independently managed. However, as Virtual Machine C is a dependent virtual machine that depends from the second snapshot chain for Virtual Machine A, changes to the second snapshot chain may impact the third snapshot chain. For example, repositioning of the base image for the second snapshot chain due to rebasing may require the merged files for the third snapshot chain to be updated.

In some embodiments, each of the snapshot chains for Virtual Machine A may have a maximum incremental chain length (e.g., no more than 100 total incremental files), a maximum reverse incremental chain length (e.g., no more than 50 reverse incremental files), and a maximum forward incremental chain length (e.g., no more than 70 forward incremental files. In the event that a new snapshot will cause one of the snapshot chains to violate the maximum incremental chain length, the maximum reverse incremental chain length, or the maximum forward incremental chain length, then a new snapshot chain may be created for Virtual Machine A and a new full-image base file may be stored for the new snapshot chain.

FIG. 2H depicts one embodiment of a merged file for generating version VS of Virtual Machine A using the set of files depicted in FIG. 2G. The merged file includes a first pointer (pBaseA) that references the first base image BaseA and a second pointer (pR4) that references the reverse incremental R4. In one embodiment, to generate the full image of version VS of Virtual Machine A, the first base image associated with Version VT of Virtual Machine A may be acquired and the data changes associated with reverse incremental R4 may be applied to the first base image to generate the full image of version VS of Virtual Machine A.

FIG. 2I depicts one embodiment of a merged file for generating version VU of Virtual Machine A using the set of files depicted in FIG. 2G. The merged file includes a first pointer (pBaseB) that references the second base image BaseB, a second pointer (pR1) that references the reverse incremental R1, a third pointer (pR2) that references the reverse incremental R2, and a fourth pointer (pR3) that references the reverse incremental R3. In one embodiment, to generate the full image of version VU of Virtual Machine A, the second base image associated with Version VY of Virtual Machine A may be acquired, the data changes associated with reverse incremental R1 may be applied to the second base image to generate a first intermediate image, the data changes associated with reverse incremental R2 may be applied to the first intermediate image to generate a second intermediate image, and the data changes associated with reverse incremental R3 may be applied to the second intermediate image to generate the full image of version VU of Virtual Machine A.

Figures 2J, 2K:
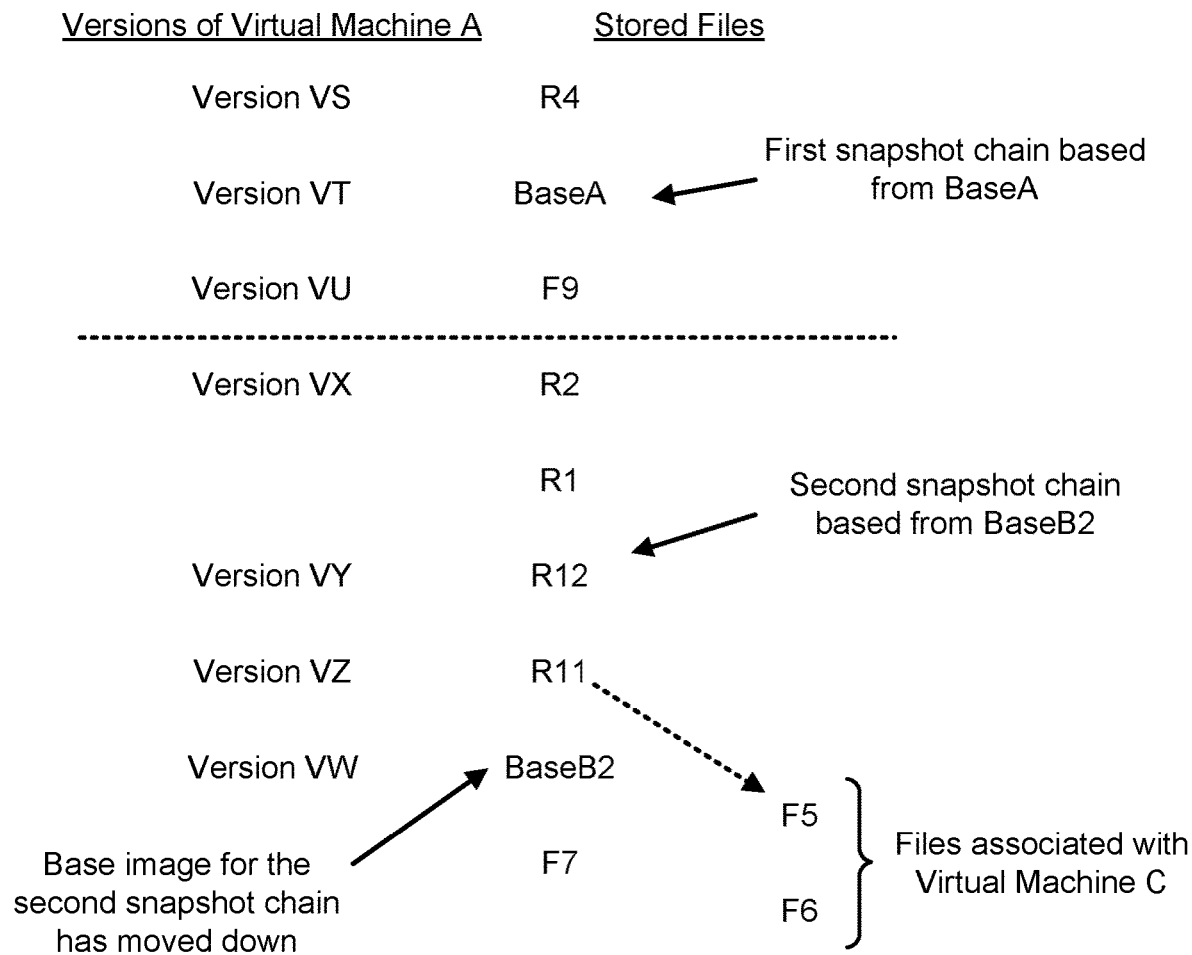

FIG. 2J depicts one embodiment of a set of files associated with multiple virtual machine snapshots after a rebasing process has been performed to a snapshot chain using the set of files in FIG. 2G. The set of files may be stored using a distributed file system, such as distributed file system 112 in FIG. 1C. The rebasing process may generate new files R12, R11, and BaseB2. As depicted, the set of files includes a set of reverse incrementals (R11-R12 and R1-R2), a full image (BaseB2), and a set of forward incrementals (F5-F7). In this case, a second version of Virtual Machine C may be generated using forward incrementals F5-F6 that are derived from Version VZ of Virtual Machine A. Forward incremental file F7 may include changes to Version VW of Virtual Machine A that occurred subsequent to the generation of the full image file BaseB2. In some cases, the forward incremental file F7 may comprise a writeable file or have file permissions allowing modification of the file, while all other files associated with earlier versions of Virtual Machine A comprise read only files.

FIG. 2K depicts one embodiment of a merged file for generating version VU of Virtual Machine A using the set of files depicted in FIG. 2J. The merged file includes a first pointer (pBaseA) that references the first base image BaseA and a second pointer (pF9) that references the forward incremental F9. In one embodiment, to generate the full image of version VU of Virtual Machine A, the first base image associated with Version VT of Virtual Machine A may be acquired and the data changes associated with forward incremental F9 may be applied to the first base image to generate the full image of version VU of Virtual Machine A.

In some embodiments, upon detection that a second snapshot chain has reached a maximum incremental chain length (e.g., no more than 500 total incremental files), a maximum reverse incremental chain length (e.g., no more than 400 reverse incremental files), or a maximum forward incremental chain length (e.g., no more than 150 forward incremental files), an existing snapshot chain (e.g., the first snapshot chain depicted in FIG. 2J) may have its chain length extended or snapshots previously assigned to the second snapshot chain may be moved to the existing snapshot chain. For example, the first snapshot chain depicted in FIG. 2G comprises two total snapshots, while the first snapshot chain depicted in FIG. 2J comprises three total snapshots as the snapshot corresponding with version VU of Virtual Machine A has moved from the second snapshot chain to the first snapshot chain.

In some embodiments, the number of snapshots in a snapshot chain may decrease over time as older versions of a virtual machine are consolidated, archived, deleted, or moved to a different storage domain (e.g., to cloud storage) depending on the data backup and archiving schedule for the virtual machine. In some cases, the maximum incremental chain length or the maximum number of snapshots for a snapshot chain may be increased over time as the versions stored by the snapshot chain age. In one example, if the versions of a virtual machine stored using a snapshot chain are all less than one month old, then the maximum incremental chain length may be set to a maximum of 200 incrementals; however, if the versions of the virtual machine stored using the snapshot chain are all greater than one month old, then the maximum incremental chain length may be set to a maximum of 1000 incrementals.

In some embodiments, the maximum incremental chain length for a snapshot chain may be increased over time as the number of allowed snapshots in a snapshot chain may be increased as the backed-up versions of a virtual machine get older. For example, the maximum incremental chain length for a snapshot chain storing versions of a virtual machine that are less than one year old may comprise a maximum incremental chain length of 200 incrementals, while the maximum incremental chain length for a snapshot chain storing versions of a virtual machine that are more than one year old may comprise a maximum incremental chain length of 500 incrementals.

Figure 3A:
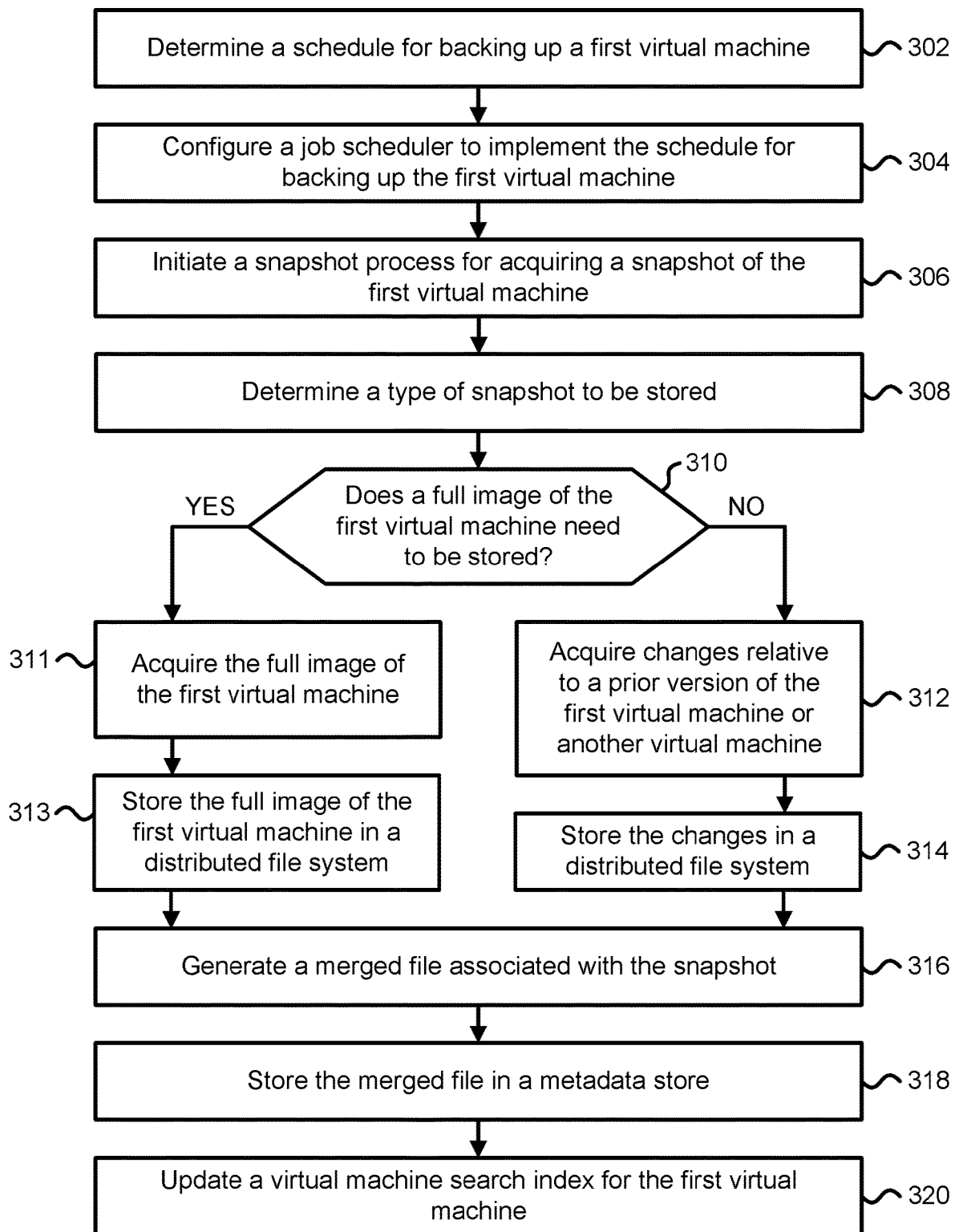
FIG. 3A is a flowchart describing one embodiment of a process for managing and storing virtual machine snapshots using a data storage system.

FIG. 3A is a flowchart describing one embodiment of a process for managing and storing virtual machine snapshots using a data storage system. In one embodiment, the process of FIG. 3A may be performed by a storage appliance, such as storage appliance 170 in FIG. 1A.

In step 302, a schedule for backing up a first virtual machine is determined. In one example, the schedule for backing up the first virtual machine may comprise periodically backing up the first virtual machine every four hours. The schedule for backing up the first virtual machine may be derived from a new backup, replication, and archival policy or backup class assigned to the first virtual machine. In step 304, a job scheduler is configured to implement the schedule for backing up the first virtual machine. In one example, a distributed job scheduler, such as distributed job scheduler 108 in FIG. 1C, may be configured to schedule and run processes for capturing and storing images of the first virtual machine over time according the schedule. In step 306, a snapshot process for acquiring a snapshot of the first virtual machine is initiated. The snapshot process may send an instruction to a virtualized infrastructure manager, such as virtualization manager 169 in FIG. 1A, that requests data associated with the snapshot of the first virtual machine. In step 308, a type of snapshot to be stored is determined. The type of snapshot may comprise a full image snapshot or an incremental snapshot. In some cases, a full image snapshot may be captured and stored in order to serve as an anchor snapshot for a new snapshot chain. Versions of the first virtual machine may be stored using one or more independent snapshot chains, wherein each snapshot chain comprises a full image snapshot and one or more incremental snapshots. One embodiment of a process for determining the type of snapshot to be stored (e.g., storing either a full image snapshot or an incremental snapshot) is described later in reference to FIG. 3B.

In step 310, it is determined whether a full image of the first virtual machine needs to be stored in order to store the snapshot of the first virtual machine. The determination of whether a full image is required may depend on whether a previous full image associated with a prior version of the first virtual machine has been acquired. The determination of whether a full image is required may depend on the determination of the type of snapshot to be stored in step 308. If a full image needs to be stored, then step 311 is performed. Otherwise, if a full image does not need to be stored, then step 312 is performed. In step 311, the full image of the first virtual machine is acquired. The full image of the first virtual machine may correspond with a file or one or more data chunks. In step 312, changes relative to a prior version of the first virtual machine or relative to another virtual machine (e.g., in the case that the first virtual machine comprises a dependent virtual machine whose snapshots derive from a full image snapshot of a second virtual machine different from the first virtual machine) are acquired. The changes relative to the prior version of the first virtual machine or relative to a version of a different virtual machine may correspond with a file or one or more data chunks. In step 313, the full image of the first virtual machine is stored using a distributed file system, such as distributed file system 112 in FIG. 1C. In step 314, the changes relative to the prior version of the first virtual machine or relative to another virtual machine are stored using a distributed file system, such as distributed file system 112 in FIG. 1C. In one embodiment, the full image of the first virtual machine may be stored using a first storage device of a first type (e.g., a HDD) and the changes relative to the prior version of the first virtual machine may be stored using a second storage device of a second type (e.g., an SSD).

In some embodiments, snapshots of the first virtual machine may be ingested at a snapshot capture frequency (e.g., every 30 minutes) by a data storage system. When a snapshot of the first virtual machine is ingested, the snapshot may be compared with other snapshots stored within the data storage system in order to identify a candidate snapshot from which the snapshot may depend. In one example, a scalable approximate matching algorithm may be used to identify the candidate snapshot whose data most closely matches the data associated with the snapshot or to identify the candidate snapshot whose data has the fewest number of data differences with the snapshot. In another example, an approximate matching algorithm may be used to identify the candidate snapshot whose data within a first portion of the candidate snapshot most closely matches data associated with a first portion of the snapshot. In some cases, a majority of the data associated with the snapshot and the candidate snapshot may be identical (e.g., both the snapshot and the candidate snapshot may be associated with virtual machines that use the same operating system and have the same applications installed). Once the candidate snapshot has been identified, then data differences (or the delta) between the snapshot and the candidate snapshot may be determined and the snapshot may be stored based on the data differences. In one example, the snapshot may be stored using a forward incremental file that includes the data differences between the snapshot and the candidate snapshot. The forward incremental file may be compressed prior to being stored within a file system, such as distributed file system 112 in FIG. 1C.

In step 316, a merged file associated with the snapshot is generated. The merged file may reference one or more files or one or more data chunks that have been acquired in either step 311 or step 312. In one example, the merged file may comprise a file or a portion of a file that includes pointers to the one or more files or the one or more data chunks. In step 318, the merged file is stored in a metadata store, such as distributed metadata store 110 in FIG. 1C. In step 320, a virtual machine search index for the first virtual machine is updated. The virtual machine search index for the first virtual machine may include a list of files that have been stored in the first virtual machine and a version history for each of the files in the list. In one example, the virtual machine search index for the first virtual machine may be updated to include new files that have been added to the first virtual machine since a prior snapshot of the first virtual machine was taken and/or to include updated versions of files that were previously stored in the first virtual machine.

Figure 3B:
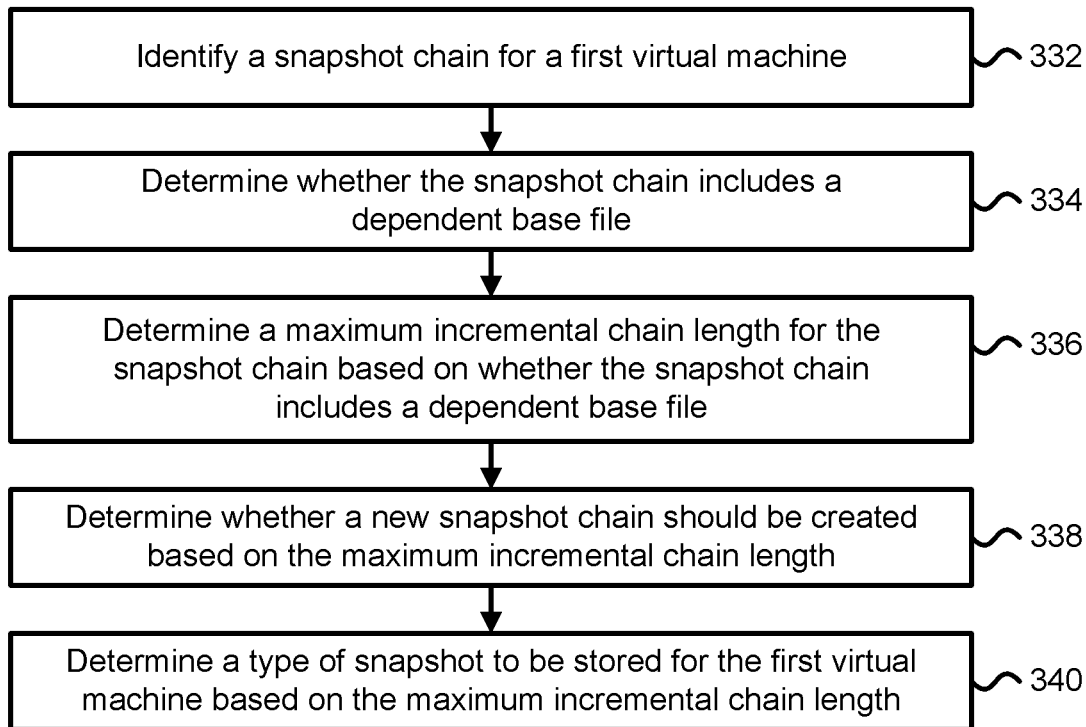
FIG. 3B is a flowchart describing one embodiment of a process for determining the type of snapshot to be stored using a data storage system.

FIG. 3B is a flowchart describing one embodiment of a process for determining the type of snapshot to be stored using a data storage system. The process described in FIG. 3B is one example of a process for implementing step 308 in FIG. 3A. In one embodiment, the process of FIG. 3B may be performed by a storage appliance, such as storage appliance 170 in FIG. 1A.

In step 332, a snapshot chain for a first virtual machine is identified. The snapshot chain may comprise a full image snapshot for the first virtual machine and one or more incremental snapshots that derive from the full image snapshot. Backed-up versions of the first virtual machine may correspond with one or more snapshot chains. Each of the one or more snapshot chains may include a full image snapshot or a base image from which incremental snapshots may derive.

In step 334, it is determined whether the snapshot chain includes a dependent base file. In this case, the first virtual machine may comprise a dependent virtual machine that has snapshots that derive from a full image snapshot of a different virtual machine. In one embodiment, the first virtual machine and the different virtual machine from which the first virtual machine depends may each have different virtual machine configuration files for storing configuration settings for the virtual machines. In one example, the first virtual machine may have a first number of virtual processors (e.g., two processors) and the different virtual machine may have a second number of virtual processors different from the first number of virtual processors (e.g., four processors). In another example, the first virtual machine may have a first virtual memory size (e.g., 1 GB) and the different virtual machine may have a second virtual memory size different from the first virtual memory size (e.g., 2 GB). In another example, the first virtual machine may run a first guest operating system and the different virtual machine may run a second guest operating system different from the first guest operating system.

In step 336, a maximum incremental chain length for the snapshot chain is determined based on whether the snapshot chain includes a dependent base file. In one example, if the first virtual machine comprises a dependent virtual machine, then the maximum incremental chain length may be set to a maximum length of 200 snapshots; however if the first virtual machine is independent and is not a dependent virtual machine, then the maximum incremental chain length may be set to a maximum length of 500 snapshots.

In one embodiment, the maximum incremental chain length for the snapshot chain may be determined based on an age of the backed-up versions within the snapshot chain. In one example, the maximum incremental chain length for a snapshot chain storing versions of the first virtual machine that are less than one year old may comprise a maximum incremental chain length of 100 incrementals, while the maximum incremental chain length for a snapshot chain storing versions of the first virtual machine that are more than one year old may comprise a maximum incremental chain length of 200 incrementals.

In step 338, it is determined whether a new snapshot chain should be created based on the maximum incremental chain length. In step 340, a type of snapshot to be stored for the first virtual machine is determined based on the maximum incremental chain length. The type of snapshot may comprise either a full image snapshot or an incremental snapshot. In one embodiment, if the snapshot chain for the first virtual machine exceeds the maximum incremental chain length for the snapshot chain, then the type of snapshot to be stored for the first virtual machine may comprise a full image snapshot. In this case, an additional snapshot chain may be created for the first virtual machine.

In some embodiments, the number of snapshots in a snapshot chain may decrease over time as older versions of a virtual machine are consolidated, archived, deleted, or moved to a different storage domain (e.g., to cloud storage) depending on the data backup and archiving schedule for the virtual machine. In some cases, the maximum incremental chain length or the maximum number of snapshots for a snapshot chain may be increased over time as the versions stored by the snapshot chain age. In one example, if the versions of a virtual machine stored using a snapshot chain are all less than one month old, then the maximum incremental chain length may be set to a maximum of 200 incrementals; however, if the versions of the virtual machine stored using the snapshot chain are all greater than one month old, then the maximum incremental chain length may be set to a maximum of 1000 incrementals.

Figure 3C:
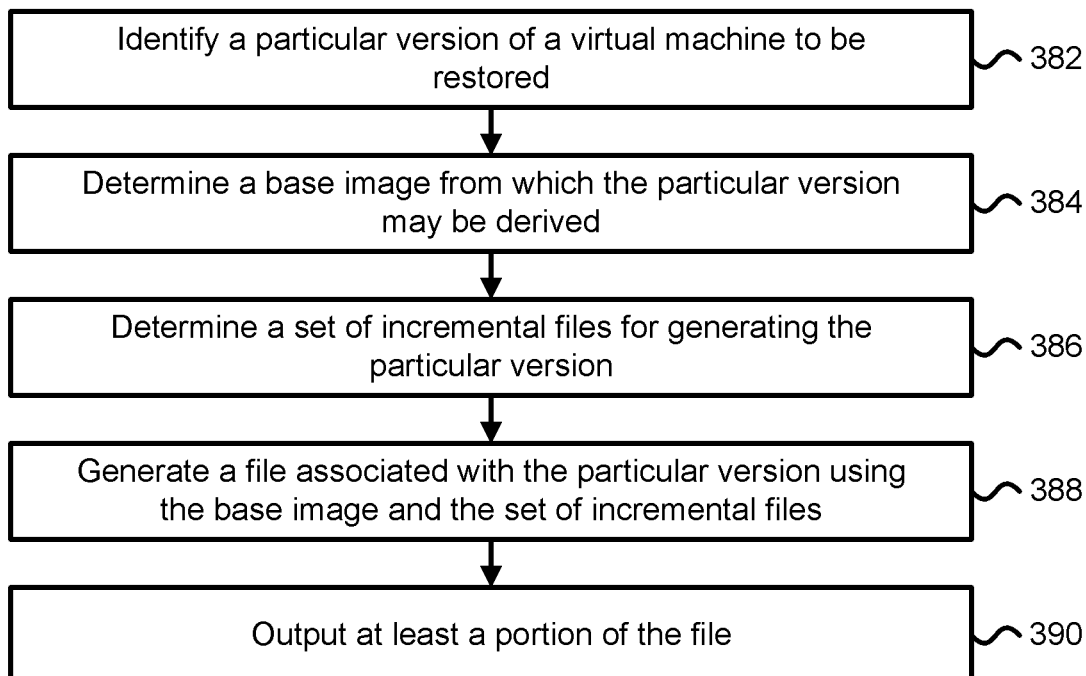
FIG. 3C is a flowchart describing one embodiment of a process for restoring a version of a virtual machine using a data storage system.

FIG. 3C is a flowchart describing one embodiment of a process for restoring a version of a virtual machine using a data storage system. In one embodiment, the process of FIG. 3C may be performed by a storage appliance, such as storage appliance 170 in FIG. 1A.

In step 382, a particular version of a virtual machine to be restored is identified. In step 384, a base image from which the particular version may be derived is determined. In step 386, a set of incremental files for generating the particular version is determined. In one embodiment, the base image and the set of incremental files may be determined from a merged file associated with the particular version of the virtual machine. In some cases, the set of incremental files may include one or more forward incremental files and/or one or more reverse incremental files. In step 388, a file associated with the particular version is generated using the base image and the set of incremental files. The file may be generated by patching the set of incremental files onto the base image. In step 390, at least a portion of the file is outputted. The at least a portion of the file may be electronically transferred to a computing device, such as computing device 154 in FIG. 1A, or to a virtualization manager, such as virtualization manager 169 in FIG. 1A.

In some embodiments, a primary system may failover to a secondary data backup system due to a failure (e.g., a hardware failure or a power failure) of the primary system. During failback, virtual machine snapshots from the secondary data backup system may be converted and then replicated or transferred to the primary system. The transferred snapshots from the secondary data backup system may be used to instantiate one or more anchor virtual machines on the primary system and then data changes made to the underlying virtual machines running on the secondary data backup system (e.g., as EC2 instances running in the cloud) may be applied to the one or more anchor virtual machines. The data changes made to the underlying virtual machines may comprise the addition and/or deletion of new disks or network devices. The one or more anchor virtual machines may comprise one or more hydrated virtual machines. After the one or more anchor virtual machines are running on the primary system, the next replicated snapshots (e.g., corresponding with subsequent snapshots of the virtual machines that were captured subsequent to the failure of the primary system) may be transferred via incremental export by only writing the changed blocks to the one or more anchor virtual machines, thereby reducing the recovery time objective in the case that a failover is triggered.

FIG. 4A depicts one embodiment of a primary system 402, such as server 160 in FIG. 1A, during a failback operation in which data is synchronized back to the primary system. The primary system 402 may comprise a production system with one or more servers in communication with each other. The primary system 402 may have failed over to a secondary data backup system not depicted, such as storage appliance 170 or storage appliance 140 in FIG. 1A, for backing up the primary system 402. The secondary data backup system may correspond with a cloud-based compute and storage service. As depicted, during the failback operation, a first virtual machine snapshot 411 out of a chain of snapshots for a virtual machine may be transferred from the secondary data backup system to the primary system 402. In one example, the chain of snapshots may correspond with the second snapshot chain with the second full image (BaseB) acting as the anchor snapshot for the second snapshot chain depicted in FIG. 2G. The primary system 402 may comprise a first virtualized environment (e.g., with VMware virtual machines) and the secondary data backup system may comprise a second virtualized environment (e.g., with Amazon EC2 instances). In this case, virtual machines running and/or stored on the secondary data backup system may need to have their OS disks converted prior to being transferred to the primary system 402. After acquisition of the first virtual machine snapshot 411, the primary system 402 may instantiate a temporary anchor virtual machine based on the first virtual machine snapshot 411. Over time, the temporary anchor virtual machine may be modified to comprise the most-recently hydrated virtual machine on the primary system 402 or to correspond with a full image of the most-recently acquired virtual machine snapshot.

FIG. 4B depicts the primary system 402 of FIG. 4A after a snapshot of the temporary anchor virtual machine depicted in FIG. 4A has been captured and stored. As depicted, a copy of the first virtual machine snapshot 411 has been captured and stored within the primary system 402. In some cases, virtual machine snapshots captured by the primary system 402 may be archived to or transferred to a data storage device in communication with the primary system 402. After the copy of the first virtual machine snapshot 411 has been captured and stored, the primary system 402 may acquire data changes DVM 422 corresponding with a second virtual machine snapshot 412 out of the chain of snapshots. In some cases, the data changes DVM 422 may comprise a forward incremental file. The data changes DVM 422 may be applied to the temporary anchor virtual machine such that the temporary anchor virtual machine is updated to correspond with a full image for the second virtual machine snapshot 412.

FIG. 4C depicts the primary system 402 after a snapshot of the temporary anchor virtual machine depicted in FIG. 4B has been captured and stored. As depicted, a copy of the second virtual machine snapshot 412 has been captured and stored within the primary system 402. After the copy of the second virtual machine snapshot 412 has been captured and stored, the primary system 402 may acquire data changes DVM 423 corresponding with a third virtual machine snapshot 413 out of the chain of snapshots. In some cases, the data changes DVM 423 may comprise a forward incremental file. The data changes DVM 423 may be applied to the temporary anchor virtual machine such that the temporary anchor virtual machine is updated to correspond with a full image for the third virtual machine snapshot 413.

FIG. 4D depicts the primary system 402 after a snapshot of the temporary anchor virtual machine depicted in FIG. 4C has been captured and stored. As depicted, a copy of the third virtual machine snapshot 413 has been captured and stored within the primary system 402. After the copy of the third virtual machine snapshot 413 has been captured and stored, the primary system 402 may acquire data changes DVM 424 corresponding with a fourth virtual machine snapshot 414 out of the chain of snapshots. In some cases, the data changes DVM 424 may comprise a forward incremental file. The data changes DVM 424 may be applied to the temporary anchor virtual machine such that the temporary anchor virtual machine is updated to correspond with a full image for the fourth virtual machine snapshot 414.

Figure 4E:
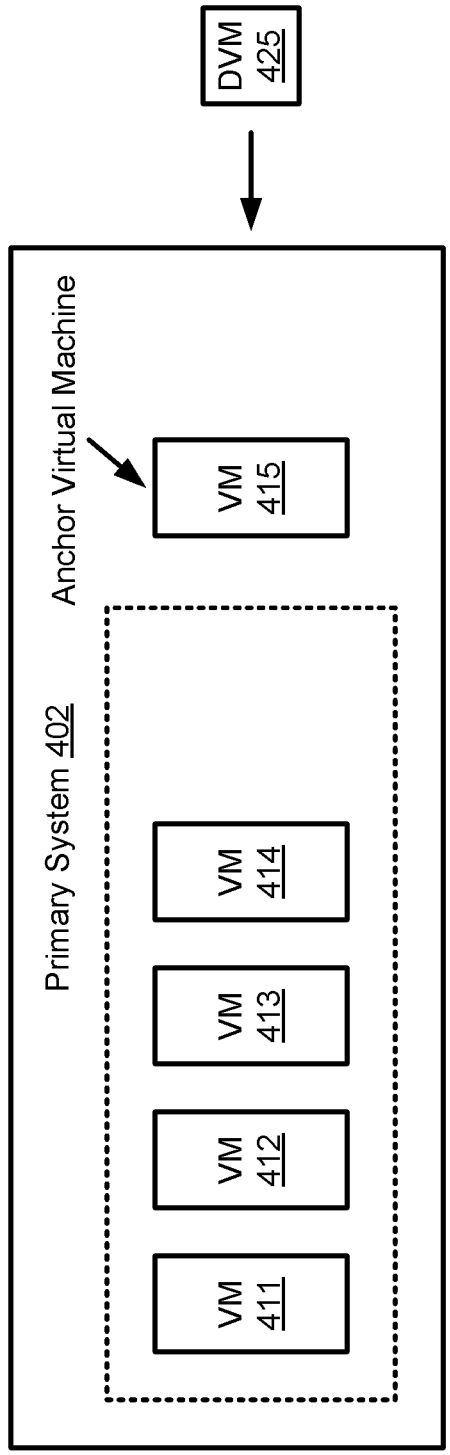
Figure 4F:
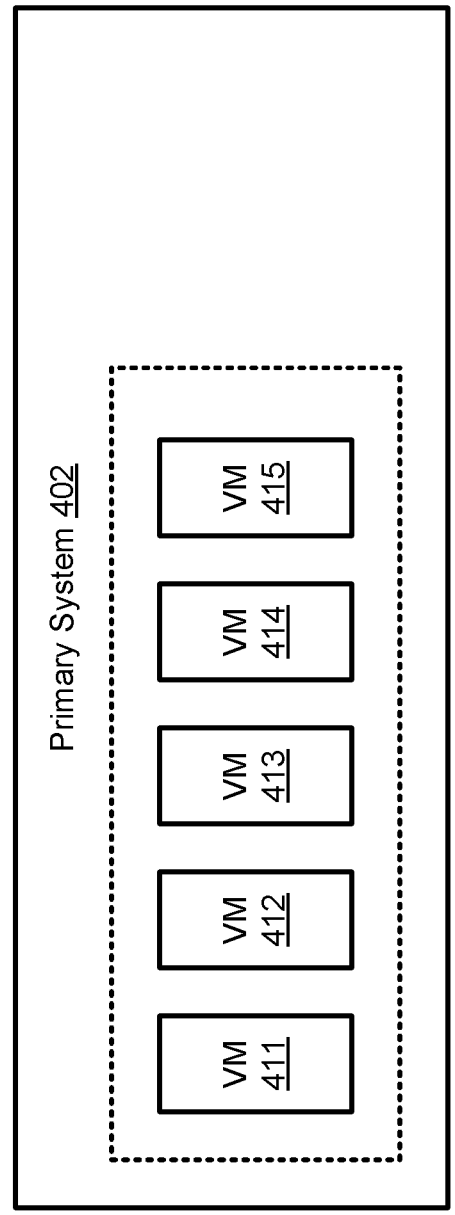

FIG. 4E depicts the primary system 402 after a snapshot of the temporary anchor virtual machine depicted in FIG. 4D has been captured and stored. As depicted, a copy of the fourth virtual machine snapshot 414 has been captured and stored within the primary system 402. After the copy of the fourth virtual machine snapshot 414 has been captured and stored, the primary system 402 may acquire data changes DVM 425 corresponding with a fifth virtual machine snapshot 415 out of the chain of snapshots. In some cases, the data changes DVM 425 may comprise a forward incremental file. The data changes DVM 425 may be applied to the temporary anchor virtual machine such that the temporary anchor virtual machine is updated to correspond with a full image for the fifth virtual machine snapshot 415. FIG. 4F depicts the primary system 402 after a snapshot of the temporary anchor virtual machine depicted in FIG. 4E has been captured and stored.

Figure 4G:
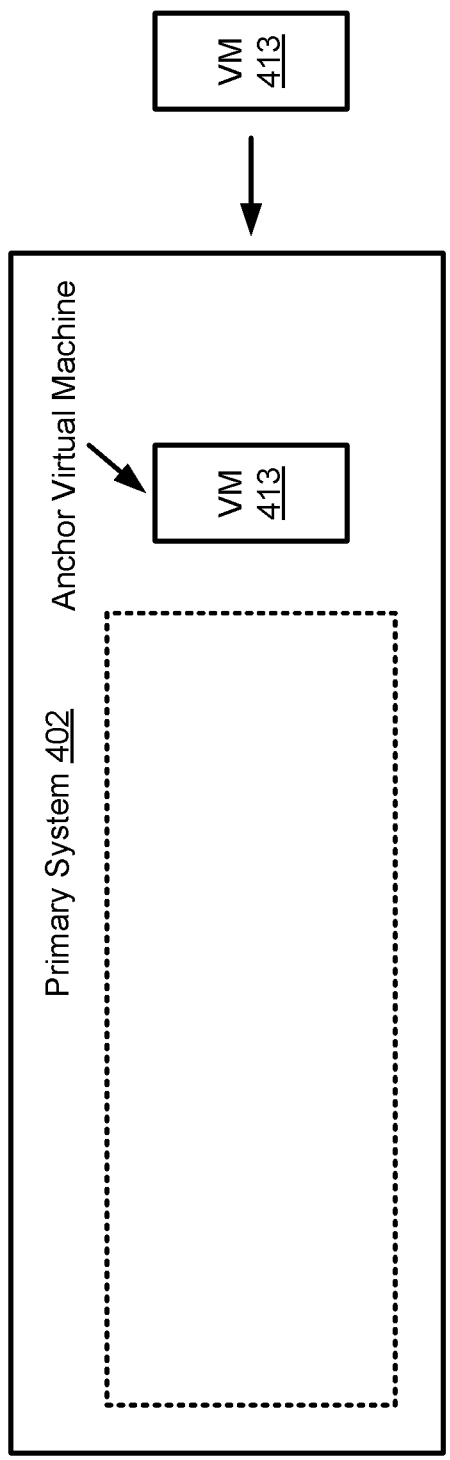

FIG. 4G depicts another embodiment of a primary system 402, such as server 160 in FIG. 1A, during a failback operation in which data is synchronized back to the primary system. The primary system 402 may comprise a production system with one or more servers in communication with each other. The primary system 402 may have failed over to a secondary data backup system not depicted, such as storage appliance 170 or storage appliance 140 in FIG. 1A, for backing up the primary system 402. The secondary data backup system may correspond with a cloud-based service for backing up data for the primary system. As depicted, during the failback operation, a third virtual machine snapshot 413 out of a chain of snapshots for a virtual machine may be transferred from the secondary data backup system to the primary system 402. The third virtual machine snapshot 413 may comprise a middle snapshot out of the chain of snapshots. The primary system 402 may comprise a first virtualized environment (e.g., with VMware virtual machines) and the secondary data backup system may comprise a second virtualized environment (e.g., with Amazon EC2 instances). In this case, virtual machines running and/or stored on the secondary data backup system may need to have their OS disks converted prior to being transferred to the primary system 402. After acquisition of the third virtual machine snapshot 413, the primary system 402 may instantiate a temporary anchor virtual machine based on the third virtual machine snapshot 413.

Figure 4H:
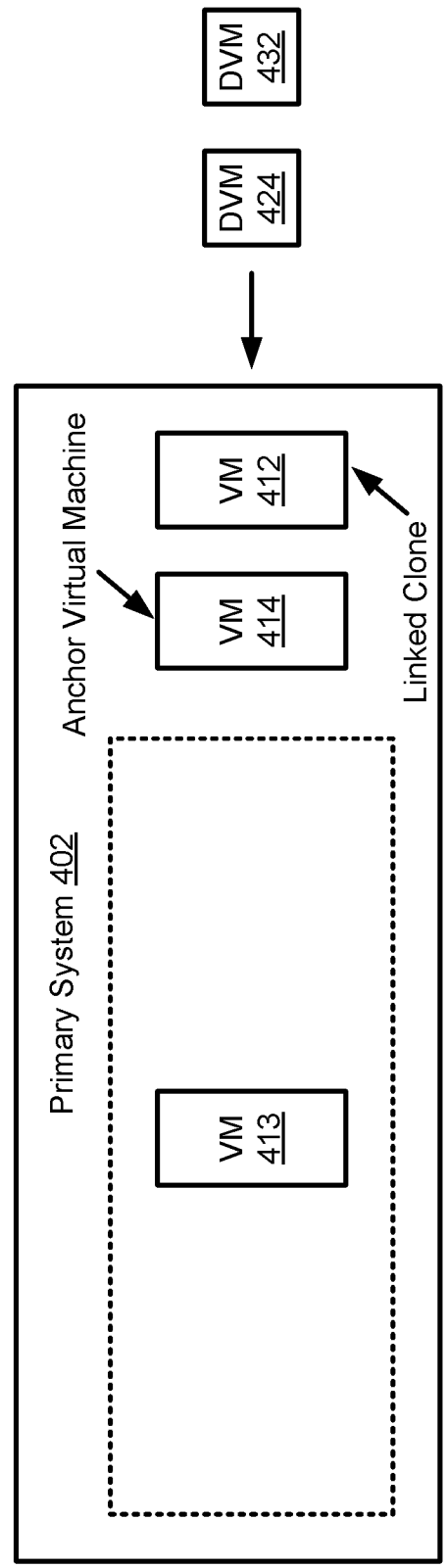

FIG. 4H depicts the primary system 402 of FIG. 4G after a snapshot of the temporary anchor virtual machine depicted in FIG. 4G has been captured and stored. As depicted, a copy of the third virtual machine snapshot 413 has been captured and stored within the primary system 402. After the copy of the third virtual machine snapshot 413 has been captured and stored, the primary system 402 may acquire data changes DVM 432 corresponding with a second virtual machine snapshot 412 out of the chain of snapshots and data changes DVM 424 corresponding with a fourth virtual machine snapshot 414 out of the chain of snapshots. In some cases, the data changes DVM 432 may comprise a reverse incremental file and the data changes DVM 424 may comprise a forward incremental file.

In some embodiments, a linked clone may be created and linked to the temporary virtual machine running on the primary system 402. The data changes DVM 424 may be applied to the temporary anchor virtual machine such that the temporary anchor virtual machine is updated to correspond with a full image for the fourth virtual machine snapshot 414. The data changes DVM 432 may be applied to the linked clone of the temporary anchor virtual machine such that the linked clone is updated to correspond with a full image for the second virtual machine snapshot 412. In other embodiments, a second temporary anchor virtual machine may be instantiated on the primary system 402 and the data changes DVM 432 may be applied to the second temporary anchor virtual machine such that the second temporary anchor virtual machine corresponds with a full image for the second virtual machine snapshot 412.

Figure 4I:
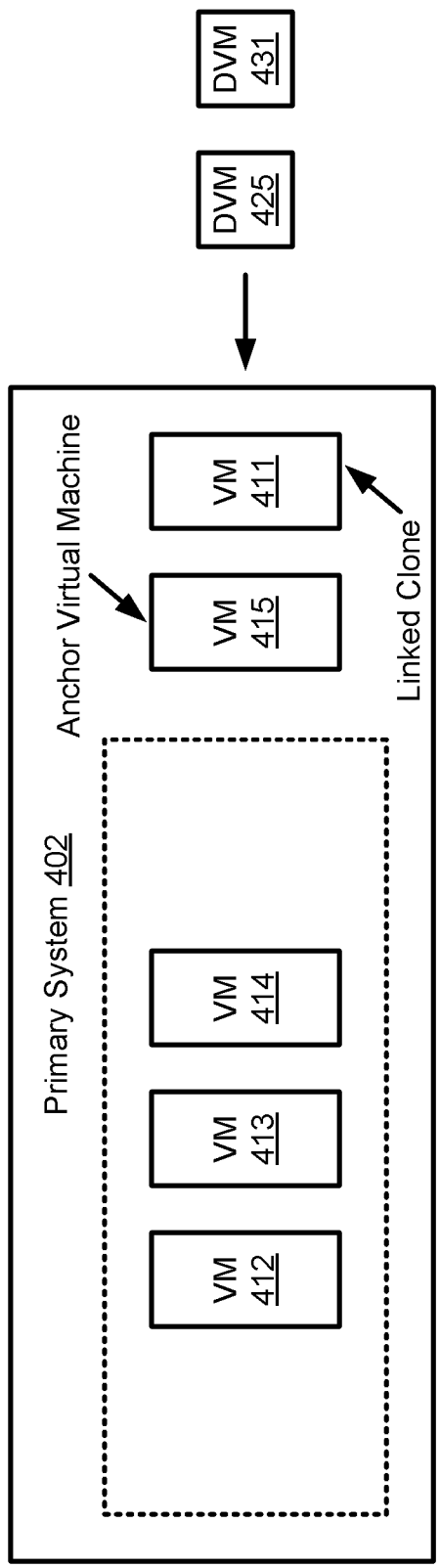
Figure 4J:
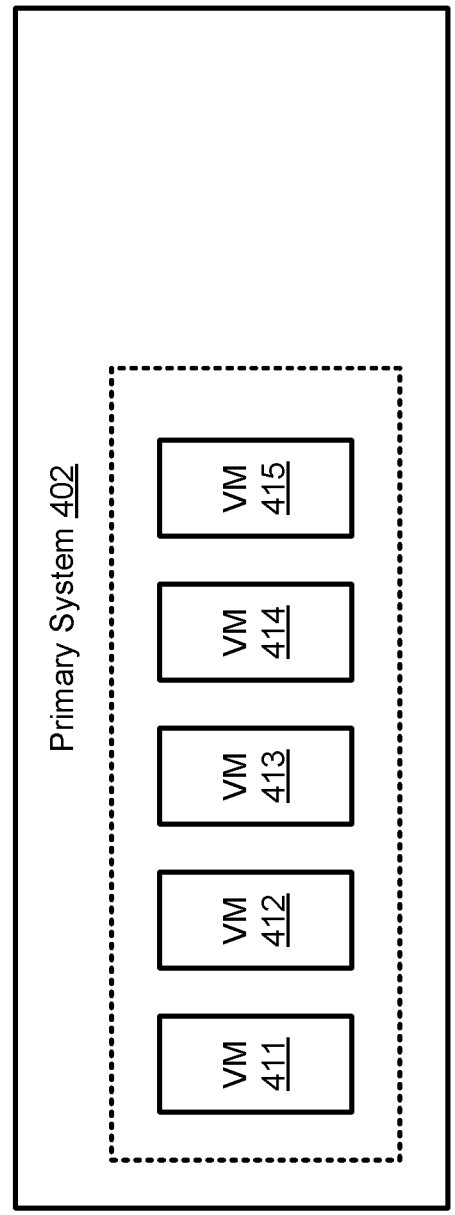

FIG. 4I depicts the primary system 402 of FIG. 4H after a snapshot of the temporary anchor virtual machine depicted in FIG. 4H has been captured and stored and after a snapshot of the linked clone depicted in FIG. 4H has been captured and stored. As depicted, a copy of the second virtual machine snapshot 412 has been captured and stored within the primary system 402 and a copy of the fourth virtual machine snapshot 414 has been captured and stored within the primary system 402. Thereafter, the primary system 402 may acquire data changes DVM 431 corresponding with a first virtual machine snapshot 411 out of the chain of snapshots and data changes DVM 425 corresponding with a fifth virtual machine snapshot 415 out of the chain of snapshots. In some cases, the data changes DVM 431 may comprise a reverse incremental file and the data changes DVM 425 may comprise a forward incremental file. The data changes DVM 425 may be applied to the temporary anchor virtual machine such that the temporary anchor virtual machine is updated to correspond with a full image for the fifth virtual machine snapshot 415. The data changes DVM 431 may be applied to the linked clone of the temporary anchor virtual machine such that the linked clone is updated to correspond with a full image for the first virtual machine snapshot 411. FIG. 4J depicts the primary system 402 after a snapshot of the temporary anchor virtual machine depicted in FIG. 4I has been captured and stored and after a snapshot of the linked clone to the temporary anchor virtual machine depicted in FIG. 4I has been captured and stored.

Figure 5A:
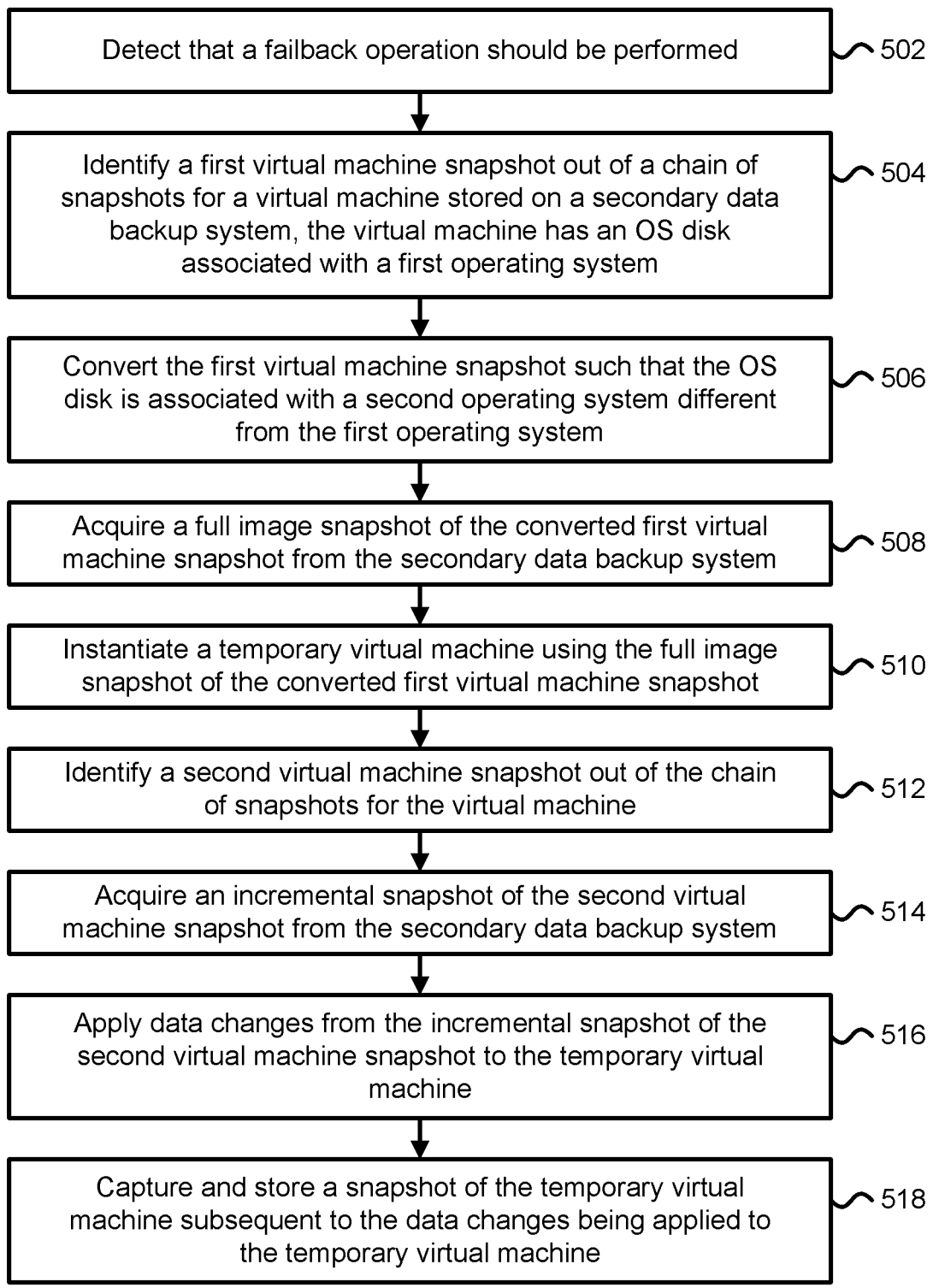
FIG. 5A is a flowchart describing one embodiment of a process for operating a server in communication with a data management and storage system during a failback operation.

FIG. 5A is a flowchart describing one embodiment of a process for operating a server in communication with a data management and storage system during a failback operation. In one embodiment, the process of FIG. 5A may be performed by one or more servers, such as server 160 in FIG. 1A, or a production server within a data center, such as data center 150 in FIG. 1A. The data management and storage system may comprise a storage appliance, such as storage appliance 140 in FIG. 1A.

In step 502, it is detected that a failback operation should be performed. A primary system may failover to a secondary data backup system due to a failure of the primary system. During the failback operation, one or more virtual machine snapshots may be converted and then transferred to the primary system. In step 504, a first virtual machine snapshot out of a chain of snapshots for a virtual machine stored on a secondary data backup system is identified. In one example, the first virtual machine snapshot may comprise the earliest point in time version of the virtual machine out of the chain of snapshots for the virtual machine. In another example, the first virtual machine snapshot may comprise the latest point in time version of the virtual machine out of the chain of snapshots for the virtual machine. The first virtual machine snapshot may correspond with the first virtual machine snapshot 411 in FIG. 4A.

The virtual machine may include an operating system (OS) disk associated with a first operating system. In step 506, the first virtual machine snapshot is converted such that the OS disk is associated with a second operating system different from the first operating system. In one example, a virtual machine conversion flow may be executed to convert EC2 instances from the secondary data backup system to VMware virtual machines. The OS disk for the virtual machine may be reconfigured to change the operating system used by the virtual machine, to install/uninstall drivers, and/or to enable/disable services.

In step 508, a full image snapshot of the converted first virtual machine snapshot is acquired from the secondary data backup system. The secondary data backup system may comprise a storage appliance, such as storage appliance 170 in FIG. 1A. The secondary data backup system may comprise a cloud-based data storage system. In step 510, a temporary virtual machine is instantiated using the full image snapshot of the converted first virtual machine snapshot. In step 512, a second virtual machine snapshot out of the chain of snapshots for the virtual machine is identified. In one example, the second virtual machine snapshot may correspond with a later point in time version of the virtual machine compared to the point in time version of the virtual machine corresponding with the first virtual machine snapshot. The second virtual machine snapshot may correspond with the second virtual machine snapshot 412 in FIG. 4B.

In step 514, an incremental snapshot of the second virtual machine snapshot is acquired from the secondary data backup system. The incremental snapshot may correspond with a forward incremental relative to the first virtual machine snapshot. The forward incremental may correspond with data changes DVM 422 in FIG. 4B. In step 516, data changes from the incremental snapshot of the second virtual machine snapshot are applied to the temporary virtual machine. In one example, the data changes from the incremental snapshot may be patched to portions of the second virtual machine snapshot. In step 518, a snapshot of the temporary virtual machine is captured and stored within the primary system subsequent to the data changes being applied to the temporary virtual machine executed within the primary system. After the snapshot of the temporary virtual machine has been captured and stored, the temporary virtual machine may be terminated to conserve memory and storage resources on the primary system. The temporary virtual machine may be instantiated and terminated on-demand.

Figure 5B:
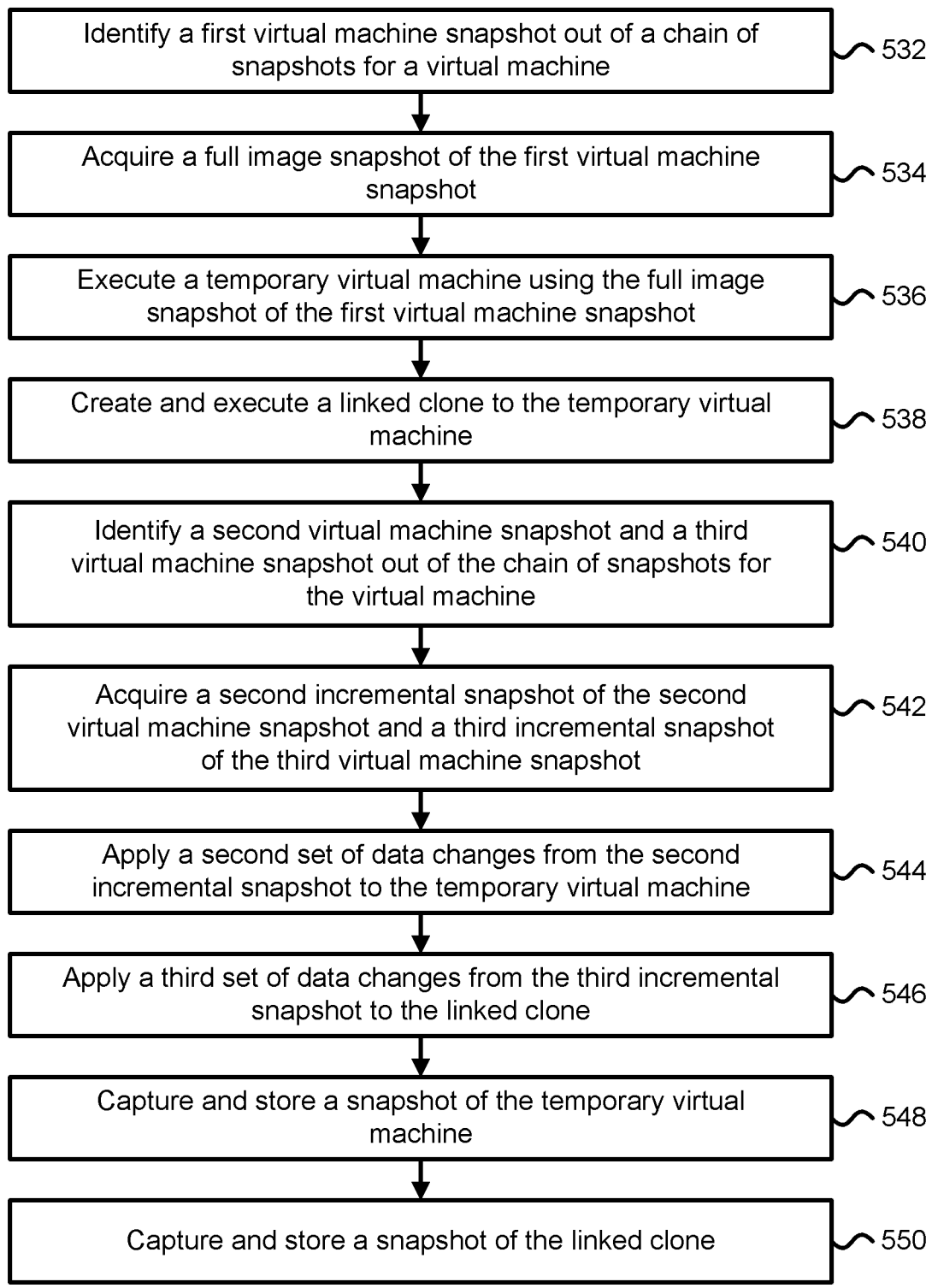
FIG. 5B is a flowchart describing an alternative embodiment of a process for operating a server in communication with a data management and storage system during a failback operation.

FIG. 5B is a flowchart describing an alternative embodiment of a process for operating a server in communication with a data management and storage system during a failback operation. In one embodiment, the process of FIG. 5B may be performed by one or more servers, such as server 160 in FIG. 1A, or a production server within a data center, such as data center 150 in FIG. 1A. The data management and storage system may comprise a storage appliance, such as storage appliance 140 in FIG. 1A.

In step 532, a first virtual machine snapshot out of a chain of snapshots for a virtual machine is identified. In one example, the first virtual machine snapshot may comprise a middle snapshot out of the chain of snapshots for which an earlier point in time version of the virtual machine and a later point in time version of the virtual machine correspond with other snapshots of the virtual machine different from the middle snapshot. The first virtual machine snapshot may correspond with the third virtual machine snapshot 413 in FIG. 4G. In step 534, a full image snapshot of the first virtual machine is acquired. The full image snapshot of the first virtual machine may be acquired by a primary system or a production server. In step 536, a temporary virtual machine is executed or instantiated using the full image snapshot of the first virtual machine snapshot.

In step 538, a linked clone to the temporary virtual machine is created and executed. The linked clone may correspond with the linked clone depicted in FIG. 4H. In step 540, a second virtual machine snapshot and a third virtual machine snapshot out of the chain of snapshots for the virtual machine are identified. In step 542, a second incremental snapshot of the second virtual machine snapshot and a third incremental snapshot of the third virtual machine snapshot are acquired. In step 544, a second set of data changes from the second incremental snapshot are applied to the temporary virtual machine. The second set of data changes may correspond with the data changes DVM 425 depicted in FIG. 4I. In step 546, a third set of data changes from the third incremental snapshot are applied to the linked clone. The third set of data changes may correspond with the data changes DVM 431 depicted in FIG. 4I. In step 548, a snapshot of the temporary virtual machine is captured and stored. In step 550, a snapshot of the linked clone is captured and stored.

One embodiment of the disclosed technology includes detecting that a failback operation should be performed and identifying a first virtual machine snapshot out of a chain of snapshots for a virtual machine in response to detecting that the failback operation should be performed. The virtual machine has an operating system disk associated with a first operating system. The method further comprises converting the first virtual machine snapshot such that the operating system disk is associated with a second operating system different from the first operating system, acquiring a full image snapshot of the converted first virtual machine snapshot, instantiating a temporary virtual machine using the full image snapshot of the converted first virtual machine snapshot, creating a linked clone to the temporary virtual machine, acquiring a second incremental snapshot for a second virtual machine snapshot out of the chain of snapshots for the virtual machine, applying a second set of data changes from the second incremental snapshot to the temporary virtual machine, acquiring a third incremental snapshot for a third virtual machine snapshot out of the chain of snapshots for the virtual machine, applying a third set of data changes from the third incremental snapshot to the linked clone, capturing and storing a snapshot of the temporary virtual machine subsequent to applying the second set of data changes from the second incremental snapshot to the temporary virtual machine, and capturing and storing a snapshot of the linked clone subsequent to applying the third set of data changes from the third incremental snapshot to the linked clone.

One embodiment of the disclosed technology includes a memory and one or more processors in communication with the memory. The one or more processors configured to detect that a failback operation should be performed and identify a first virtual machine snapshot out of a chain of snapshots for a virtual machine in response to detection that the failback operation should be performed. The virtual machine includes an operating system disk associated with a first operating system. The one or more processors configured to acquire a full image snapshot of the first virtual machine snapshot. The one or more processors configured to execute a temporary virtual machine using the full image snapshot of the first virtual machine snapshot and create a linked clone to the temporary virtual machine. The one or more processors configured to acquire a second incremental snapshot for a second virtual machine snapshot out of the chain of snapshots for the virtual machine and apply a second set of data changes from the second incremental snapshot to the temporary virtual machine. The one or more processors configured to acquire a third incremental snapshot for a third virtual machine snapshot out of the chain of snapshots for the virtual machine and apply a third set of data changes from the third incremental snapshot to the linked clone. The one or more processors configured to capture and store a snapshot of the temporary virtual machine in the memory subsequent to application of the second set of data changes from the second incremental snapshot to the temporary virtual machine. The one or more processors configured to capture and store a snapshot of the linked clone in the memory subsequent to applying the third set of data changes from the third incremental snapshot to the linked clone.

The disclosed technology may be described in the context of computer-executable instructions, such as software or program modules, being executed by a computer or processor. The computer-executable instructions may comprise portions of computer program code, routines, programs, objects, software components, data structures, or other types of computer-related structures that may be used to perform processes using a computer. In some cases, hardware or combinations of hardware and software may be substituted for software or used in place of software.

Computer program code used for implementing various operations or aspects of the disclosed technology may be developed using one or more programming languages, including an object oriented programming language such as Java or C++, a function programming language such as Scala, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for operating a data management system, comprising:
   detecting that a failback operation should be performed;
   identifying a first virtual machine snapshot out of a chain of snapshots for a virtual machine in response to detecting that the failback operation should be performed, the virtual machine has an operating system disk associated with a first operating system;
   converting the first virtual machine snapshot such that the operating system disk is associated with a second operating system different from the first operating system;
   acquiring a full image snapshot of the converted first virtual machine snapshot;
   instantiating a temporary virtual machine using the full image snapshot of the converted first virtual machine snapshot;
   creating a linked clone to the temporary virtual machine;
   acquiring a second incremental snapshot for a second virtual machine snapshot out of the chain of snapshots for the virtual machine;
   applying a second set of data changes from the second incremental snapshot to the temporary virtual machine;
   acquiring a third incremental snapshot for a third virtual machine snapshot out of the chain of snapshots for the virtual machine;
   applying a third set of data changes from the third incremental snapshot to the linked clone;
   capturing and storing a snapshot of the temporary virtual machine subsequent to applying the second set of data changes from the second incremental snapshot to the temporary virtual machine; and
   capturing and storing a snapshot of the linked clone subsequent to applying the third set of data changes from the third incremental snapshot to the linked clone.

2. The method of claim 1, wherein:
   the first virtual machine snapshot comprises the earliest point in time snapshot for the virtual machine out of the chain of snapshots.

3. The method of claim 1, wherein:
   the first virtual machine snapshot comprises a middle snapshot for the virtual machine out of the chain of snapshots.

4. The method of claim 1, wherein:
   the second incremental snapshot corresponds with a forward incremental.

5. The method of claim 4, wherein:
   the third incremental snapshot corresponds with a reverse incremental.

6. The method of claim 1, wherein:
   the converting the first virtual machine snapshot includes modifying the operating system disk to install one or more drivers for the second operating system.

7. The method of claim 1, wherein:
the detecting that the failback operation should be performed includes detecting that a primary system is available to receive the converted first virtual machine snapshot from a secondary data backup system.

8. The method of claim 7, wherein:
the primary system is associated with a first virtualized environment; and
the secondary data backup system is associated with a second virtualized environment different from the first virtualized environment.

9. The method of claim 7, wherein:
the primary system is associated with an on-premise virtualized environment; and
the secondary data backup system is associated with a cloud virtualized environment.

10. The method of claim 1, further comprising:
concurrently capturing the snapshot of the temporary virtual machine and the snapshot of the linked clone and subsequently terminating the temporary virtual machine.

11. A data management system, comprising:
a memory; and
one or more processors in communication with the memory configured to detect that a failback operation should be performed and identify a first virtual machine snapshot out of a chain of snapshots for a virtual machine in response to detection that the failback operation should be performed, the virtual machine includes an operating system disk associated with a first operating system, the one or more processors configured to acquire a full image snapshot of the first virtual machine snapshot, the one or more processors configured to execute a temporary virtual machine using the full image snapshot of the first virtual machine snapshot and create a linked clone to the temporary virtual machine, the one or more processors configured to acquire a second incremental snapshot for a second virtual machine snapshot out of the chain of snapshots for the virtual machine and apply a second set of data changes from the second incremental snapshot to the temporary virtual machine, the one or more processors configured to acquire a third incremental snapshot for a third virtual machine snapshot out of the chain of snapshots for the virtual machine and apply a third set of data changes from the third incremental snapshot to the linked clone, the one or more processors configured to capture and store a snapshot of the temporary virtual machine in the memory subsequent to application of the second set of data changes from the second incremental snapshot to the temporary virtual machine, the one or more processors configured to capture and store a snapshot of the linked clone in the memory subsequent to applying the third set of data changes from the third incremental snapshot to the linked clone.

12. The data management system of claim 11, wherein:
the first virtual machine snapshot comprises the earliest point in time snapshot for the virtual machine out of the chain of snapshots.

13. The data management system of claim 11, wherein:
the first virtual machine snapshot comprises a middle snapshot for the virtual machine out of the chain of snapshots.

14. The data management system of claim 11, wherein:
the second incremental snapshot corresponds with a forward incremental.

15. The data management system of claim 11, wherein:
the third incremental snapshot corresponds with a reverse incremental.

16. The data management system of claim 11, wherein:
the one or more processors configured to detect that a primary system is available to receive the first virtual machine snapshot from a secondary data backup system.

17. The data management system of claim 16, wherein:
the primary system is associated with a first virtualized environment; and
the secondary data backup system is associated with a second virtualized environment different from the first virtualized environment.

18. The data management system of claim 16, wherein:
the primary system is associated with an on-premise virtualized environment; and
the secondary data backup system is associated with a cloud virtualized environment.

19. The data management system of claim 11, wherein:
the second incremental snapshot corresponds with a forward incremental; and
the third incremental snapshot corresponds with a forward incremental.

20. One or more storage devices containing processor readable code for programming one or more processors to perform a method for operating a data management system, the processor readable code comprising:
processor readable code configured to detect that a failback operation should be performed;
processor readable code configured to identify a first virtual machine snapshot out of a chain of snapshots for a virtual machine in response to detection that the failback operation should be performed, the virtual machine includes an operating system disk associated with a first operating system;
processor readable code configured to acquire a full image snapshot of the first virtual machine snapshot;
processor readable code configured to execute a temporary virtual machine using the full image snapshot of the first virtual machine snapshot;
processor readable code configured to create a linked clone to the temporary virtual machine;
processor readable code configured to acquire a second incremental snapshot for a second virtual machine snapshot out of the chain of snapshots for the virtual machine;
processor readable code configured to apply a second set of data changes from the second incremental snapshot to the temporary virtual machine;
processor readable code configured to acquire a third incremental snapshot for a third virtual machine snapshot out of the chain of snapshots for the virtual machine;
processor readable code configured to apply a third set of data changes from the third incremental snapshot to the linked clone;
processor readable code configured to capture and store a snapshot of the temporary virtual machine; and
processor readable code configured to capture and store a snapshot of the linked clone.

* * * * *